United States Patent [19]

Freestone et al.

[11] Patent Number: 5,943,657
[45] Date of Patent: Aug. 24, 1999

[54] COMMUNICATIONS PRICING AND CHARGING MAINTENANCE SUB-SYSTEM AND PROCESS

[75] Inventors: David Freestone, Ipswich; Anthony Heritage, London; Brian S. Kerr, Richmond; Timothy Regan, Woodbridge; Paul H Thompson, London; Clazien D Wezeman, Ipswich; Jeremy Wilson, Ipswich, all of United Kingdom

[73] Assignee: British Telecommunications public limited company, London, United Kingdom

[21] Appl. No.: 08/723,410

[22] Filed: Sep. 30, 1996

Related U.S. Application Data

[63] Continuation of application No. PCT/GB95/00732, Mar. 30, 1995, which is a continuation-in-part of application No. 08/253,739, Jun. 3, 1994, abandoned.

[30] Foreign Application Priority Data

Mar. 30, 1994 [EP] European Pat. Off. ............ 94302289
Mar. 30, 1994 [EP] European Pat. Off. ............ 94302290

[51] Int. Cl.$^6$ .................................................. G06F 17/60
[52] U.S. Cl. ..................... 705/400; 379/111; 379/114; 379/121; 705/1
[58] Field of Search ................................ 364/400, 464.1; 379/111, 114, 115, 121; 395/201, 230, 231, 651, 701, 702, 705, 712; 705/1, 30, 31, 400

[56] References Cited

U.S. PATENT DOCUMENTS

| | | | |
|---|---|---|---|
| 3,751,637 | 8/1973 | Dillon et al. | 235/375 |
| 3,845,280 | 10/1974 | Dillon et al. | 235/383 |
| 4,122,308 | 10/1978 | Weinberger et al. | 379/131 |
| 5,003,584 | 3/1991 | Benyacar et al. | 379/119 |
| 5,008,929 | 4/1991 | Steven et al. | 379/112 |
| 5,148,474 | 9/1992 | Haralambopoulos et al. | 379/111 |
| 5,185,695 | 2/1993 | Pruchnicki | 395/214 |
| 5,293,310 | 3/1994 | Carroll et al. | 395/214 |

(List continued on next page.)

FOREIGN PATENT DOCUMENTS

| | | |
|---|---|---|
| A-0455447 | 11/1991 | European Pat. Off. . |
| A-9103023 | 3/1991 | WIPO . |
| A-9308661 | 4/1993 | WIPO . |

OTHER PUBLICATIONS

Gebhardt et al, "Model–Oriented Software Development—a New Way From Problem to Program Explained by a Program for Tax Calculation", WIRTSCHAFTSINFORMATIK, Jun. 1992, Germany, vol. 34, No. 3, ISSN 0937–6429, pp. 307–326.

(List continued on next page.)

*Primary Examiner*—Edward R. Cosimano
*Attorney, Agent, or Firm*—Nixon & Vanderhye P.C.

[57] ABSTRACT

Pricing and charging arrangements available to communication network operators or service providers take account of factors such as taxes which affect the billable value and which may be put in place in many different ways and at variable times in relation to data processing exercises which need to be carried out. A system is provided which can be used in generating bills by applying modifying factors which can be changed or added to in a relatively easy manner. An object-oriented front end for a legacy system can be used in design and subsequently embedded. Programs developed in an object oriented environment are converted into instructions implementable by a procedurally based processing device. An activity hierarchy of functions is created for each object, a data subject area is created for each object and a main calling program specifies the relationship between the programs and data areas so as to retain encapsulation of the original object oriented definition. This is particularly useful for developing new systems in an object oriented environment which may then be embedded into existing procedurally based systems.

39 Claims, 15 Drawing Sheets

U.S. PATENT DOCUMENTS

| | | | |
|---|---|---|---|
| 5,335,169 | 8/1994 | Chong | 395/231 |
| 5,337,246 | 8/1994 | Carroll et al. | 364/464.12 |
| 5,408,519 | 4/1995 | Pierce et al. | 379/67 |
| 5,469,497 | 11/1995 | Pierce et al. | 379/115 |
| 5,590,037 | 12/1996 | Ryan et al. | 395/204 |
| 5,634,012 | 5/1997 | Stefik et al. | 395/239 |
| 5,694,322 | 12/1997 | Westerlage et al. | 705/417 |
| 5,774,533 | 6/1998 | Patel | 379/127 |
| 5,793,852 | 8/1998 | Kang et al. | 379/115 |
| 5,805,680 | 9/1998 | Penzias | 379/118 |

OTHER PUBLICATIONS

Caseau, "A Formal System for Producing Demons from Rules in an Object–Oriented Database", Deductive and Object–Oriented Databases Proceedings of the First International Conference (D00D89), Kyoto, Japan, Dec. 4–6, 1989, ISBN 0–444–88433–5, 1990, Amsterdam, Netherlands, pp. 203–219.

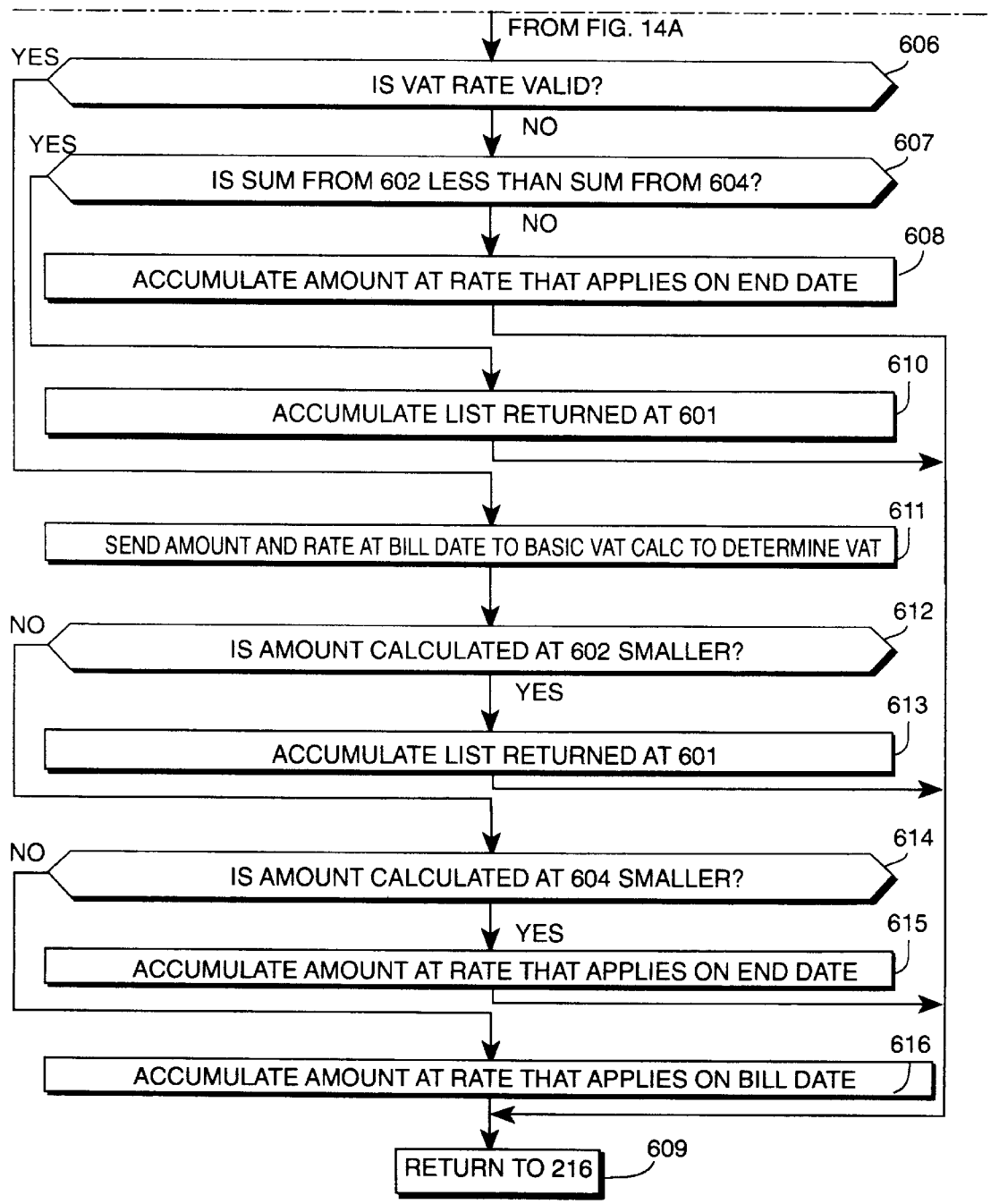

COMMUNICATIONS PRICING AND CHARGING MAINTENANCE SUB-SYSTEM AND PROCESS

CROSS-REFERENCE TO RELATED APPLICATIONS

This application is a continuation (under 35 USC §120/365) of PCT/GB95/00732 designating the U.S. and filed Mar. 30, 1995 (now abandoned) as, in turn, a continuation-in-part (under 35 USC §120/365) of U.S. application Ser. No. 08/253,739 filed Jun. 3, 1994 (now abandoned).

BACKGROUND OF THE INVENTION

1. Field of the Invention

The present invention relates to a data processing system for use in pricing and charging equipment and a production process therefor.

2. Related Art

The data processing system finds particular application in communications systems, for identifying and/or adjusting amounts billed to a customer, based on charge-related values such as call duration, in respect of additional factors such as taxes which are liable to be subject to change. It is becoming increasingly important, particularly in the communications arena as communications systems grow ever more sophisticated, that factors involved in calculating billable amounts can be both taken into account and updated even in complex billing systems which have to handle a wide variety of events and conditions.

The production process mentioned above provides a method of converting programs developed in an object oriented environment into instructions implementable by a procedurally based processing device.

Traditionally, large data processing systems were developed using procedural languages, such as COBOL and FORTRAN etc. Some of these systems are extremely large and are responsible for fundamental operational requirements of organisations, often essential to the core business of said operations. Consequently, great care must be taken when such systems are modified. Furthermore, given the level of investment made in such systems, it is not practical to redevelop a whole system when modifications are required.

Large systems of this type, often developed using techniques which have been superseded by improved development techniques, are often referred to as "legacy" systems or "heritage" systems, in which, were the system to be produced today, different techniques would be employed so as to improve reliability, robustness and the ability to implement amendments as changes in operating conditions occur. However, given that these existing systems often relate to very important aspects of an operation and represent a very large investment made by the operator, there is clearly a reluctance to make modifications unless these become absolutely necessary.

Unfortunately, from an operator's point of view, modifications do become necessary, due to essential changes to the way in which the operation is performed, possibly driven by changes in the laws or rules etc., under which the operation is performed. Under these circumstances, it is therefore necessary to implement changes to existing systems. However, such changes need to be implemented without affecting the rest of the system, thereby ensuring that the operation continues to function as a whole, secure in the knowledge that other aspects of the system will not be impaired by the new amendments.

A further problem arises in that new instructions for the existing system must be consistent with the original instruction set, which suggests that modifications must be implemented using the techniques available when the system was originally developed. This would therefore result in developers being constrained to use old fashioned techniques instead of being able to make use of modern developments. Furthermore, newly trained system developers would tend to be more familiar with modern techniques, therefore, if forced to use previous techniques, such designers would not benefit from their more modern skill, experience and expertise.

Object oriented environments are known, an example of which is that provided by the Al International Corporation and licensed under the Trade Mark "Visual works" which includes the language "Smalltalk 80". In an object oriented environment, data is encapsulated in functionality to provide units of software known as objects. The data is then not directly accessible to entities external to the object. The object oriented environment is developed by defining these objects and defining the communications between them. Procedural environments in contrast provide separate files for instructions and data. The transformation of object instructions into procedural instructions therefore consists of, amongst other things, collecting instructions from objects and collecting data from objects and grouping these collections into files which may be implemented within the procedural environment of the existing system.

SUMMARY OF THE INVENTION

According to a first aspect of the present invention, there is provided a data processing system, for use in pricing and charging equipment, to process data which has an associated set of modifying factors, by selecting and applying appropriately one or more of said modifying factors, the system comprising:

i) a data input, for data relating to one or more chargeable event(s) and containing for each event at least one charge-related value, such as duration, and at least one piece of additional data, such as event date;

ii) a process control module for controlling processing of said data;

iii) a first data store holding a set of definitions and a set of identifiers for said definitions, each definition including, directly or indirectly, at least one of said modifying factors and, associated with each modifying factor, at least one condition such as date of validity; and iv) a second data store arranged in sections allocated to respective modifying factors, wherein, on receipt of data at the input, the process control module ensures that the system determines a relevant identifier, accesses the first data store and locates the relevant definition for that identifier, sorts the data according to modifying factor, using said additional data and the relevant definition, and outputs the charge-related values from the data to the sections of the second data store, whereafter the system applies the allocated modifying factor(s) to the contents of the sections and outputs billable values thus generated.

Generally the system will be operating in a broader environment, such as the billing and charging environment of a communications system, and, although the relevant identifier may be presented to the system in a number of ways, in the broader environment it will already be associated with incoming data.

A data processing system according to the first aspect of the present invention provides a very flexible arrangement in terms of changes in modifying factors. In particular, it allows charges arising before and after a change in tax regime to be billed appropriately, even if the bill itself is only to be compiled at a later date. For instance, if there is a change in relevant tax rates on a particular communications service, it is possible to accommodate that change, even if billing in arrears, by updating the definitions. In this case, the identifiers might each identify a tax category and the definitions would set out dates on which that tax category was valid or on which the rate of taxation for that category changed. A new class of tax can also be taken into account simply by adding a new identifier and definition.

Alternatively, the identifiers may identify a product or service and the definitions then might set out relevant tax categories for the products or services, and the date or dates on which the tax categories were or are effective. Again alternatively, the identifiers may identify a class of user and the definitions set out tax categories, and relevant dates of validity, for the classes of user.

The first data store may of course be divided to accommodate more than one type of sets of identifiers and definitions, to be called upon appropriately by the data processing system, and this aspect gives the system particular flexibillity.

Using an object-oriented environment, whether or not in combination with a different type of environment, an embodiment of the present invention could be described as a process for generating billable amounts in respect of data records for the supply of goods or services over a period of time, characterised by:

a period charge interface object, which provides control functionality for use by the process in relation to charges incurred by a user over a period of time;

a tax table object, defining tax rates and callable by said period charge interface object;

a tax calculation object for calculating tax values in respect of said supply of goods or services, callable by the period charge interface object; and an accumulation object, for accumulating values returned to the period charge object from the tax calculation object, wherein, in use, input data including a period start date and a period end date are supplied to the period charge interface object, tax rates are supplied to the period charge interface object from the tax table object, a tax calculation is made by the tax calculation object, and resulting calculated tax values are supplied to the accumulation object.

It is possible to determine the functionality of an object by assigning it a set of alternative policies. The policies each may for instance set out a different algorithm which the object will apply. Part of the functionality of the object is to offer a user, or some other source of input, a choice between the policies. This is a particularly useful approach to use in embodiments of the present invention to achieve different outputs from the system. It also allows different options to be built into the system at a later date, for instance by loading different types of table and updating the policies in the relevant object providing control functionality.

According to a second aspect of the present invention, there is provided a method of converting programs developed in an object oriented environment into instructions implementable by a procedurally based processing device, characterised by:

creating an activity hierarchy of functions for each of said objects;

creating a data subject area for each of said objects; and defining a matrix of processes against data entities arranged to specify the relationship between the object derived programs and the object derived data subject areas to thereby retain the encapsulation defined by the object oriented program.

BRIEF DESCRIPTION OF THE DRAWINGS

The invention will now be described by way of example only, with reference to the accompanying drawings, in which.

DETAILED DESCRIPTION OF EXEMPLARY EMBODIMENTS

Figure 1:
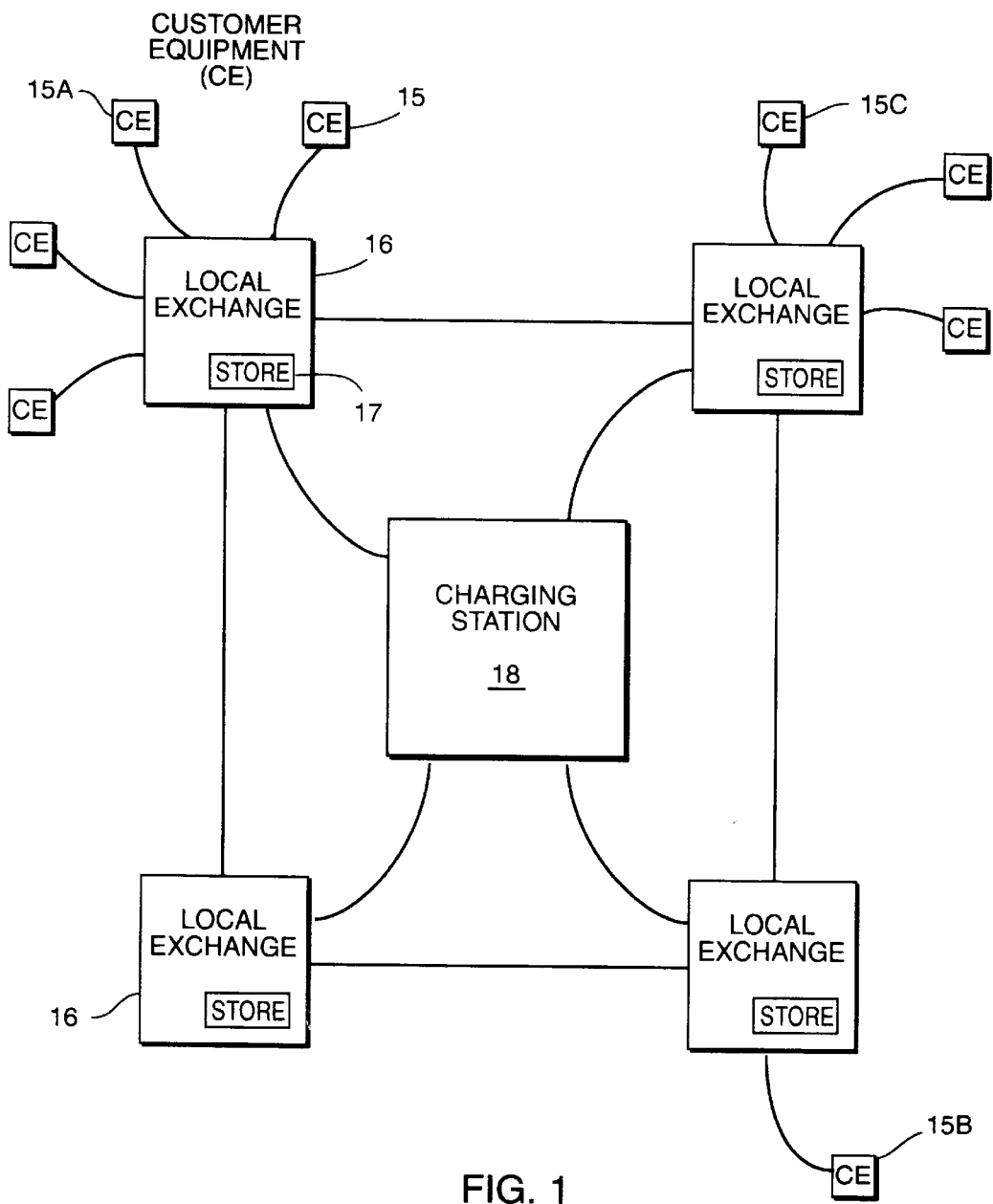
FIG. 1 schematically represents customer terminal equipment connected to interconnected local exchanges and a central charging station.

A schematic representation of customer terminal equipment 15 connected to local exchange 16 is illustrated in FIG. 1. Each local exchange includes storage means 17 for collecting data relating to calls made by customers 15 connected to the associated local exchange 16.

If a customer initiates a call using terminal equipment 15A to call terminal equipment 15B, data is logged in the storage means 17 of local exchange 16 identifying the telephone number of the customer equipment 15B. In addition, information may also be stored concerning the charge band for customer equipment 15B, such as local, long distance or international etc. Furthermore, data is stored which identifies the way in which the call was made which, for example, may state that the call was made by the telephone number for terminal equipment 15B being dialled directly on terminal equipment 15A. Alternatively, the call could have been instigated with intervention from a manual operator which, usually, would result in a higher rate of charge for the caller 15A. It is also possible that, although terminal equipment 15A is being used to make the call, it is being made by a customer who is actually signed up for terminal equipment 15C and, using charge card facilities, the cost of the charge is re-directed to the account associated with terminal equipment 15C, rather than the account associated with terminal equipment 15A.

Telephone bills are usually despatched to customers on a quarterly basis and the trend has been towards the despatching of bills from a central charging office, rather than from each individual local exchange or regional exchange etc. The advantage of despatching bills from a central office is that, particularly with sophisticated systems which facilitate the use of charge cards etc, it is possible to obtain information from a plurality of sources and bring it together for inclusion on a single customer's bill. It is clearly advantageous from both the customers point of view and from the network providers point of view, given that it is unnecessary to generate more than one account, with sophisticated services being added to conventional services and presented to the customer on a single account.

Thus, a central charging station 18 routinely polls each of the local exchanges 16 to obtain stored information relating to usage made by particular customers. For the purpose of this example, it will be assumed that the time has come for the central charging station 18 to generate a customer's account for the customer associated with the terminal equipment 15A. The charging station 18 may have already been supplied with some of the information it requires, such as use of charge cards from other stations etc. It is now required to make a more conventional investigation as to the normal-type telephone calls made using terminal equipment 15a. Thus, the charging station 18 "polls" storage device 17 at the local exchange 16 associated with the terminal equipment 15a. In response to a polling signal, storage device 17 supplies the data stored therein relating to terminal equipment 15A to the central charging station 18.

Clearly, it is essential from the network provider's point of view that sophisticated handshaking and security provisions are made when this information is transferred and many references are available as to how this should be executed. However, suffice to say, for the purposes of the present disclosure, all of the relevant information is transferred from storage device 17 and the device 17 is effectively cleared so that it may start afresh recording new usage made using terminal equipment 15A, as part of the next charging period.

The charging station 18 includes a plurality of large mainframe computers. Given the centralised nature of the system, the programs running on said computers are extremely large, therefore although it is desirable or necessary to make modifications from time to time to the existing system, extreme caution must be employed to ensure that the overall operation of the system is maintained.

The present embodiment provides mechanisms by which modifications to the existing procedural system at the central charging station 18 may be implemented within an object oriented environment, thereby facilitating system creation, system validation and system modification, before processing this information to produce instructions executable on the existing system.

One of the functions performed by the central charging station 18 is the calculation of value added tax (VAT). Previously systems were programmed in accordance with whatever VAT rules were appropriate at the time. Clearly, when modifications were made to the way in which VAT is calculated, such as increases in the rate of VAT, the type of products to which VAT applied and the specific way in which the VAT was calculated, it was necessary to reformulate instructions compatible with the existing system. The present embodiment allows instructions relating to the generation of VAT amounts to be determined within an object oriented environment and thereafter incorporated into the existing system.

Figure 2:
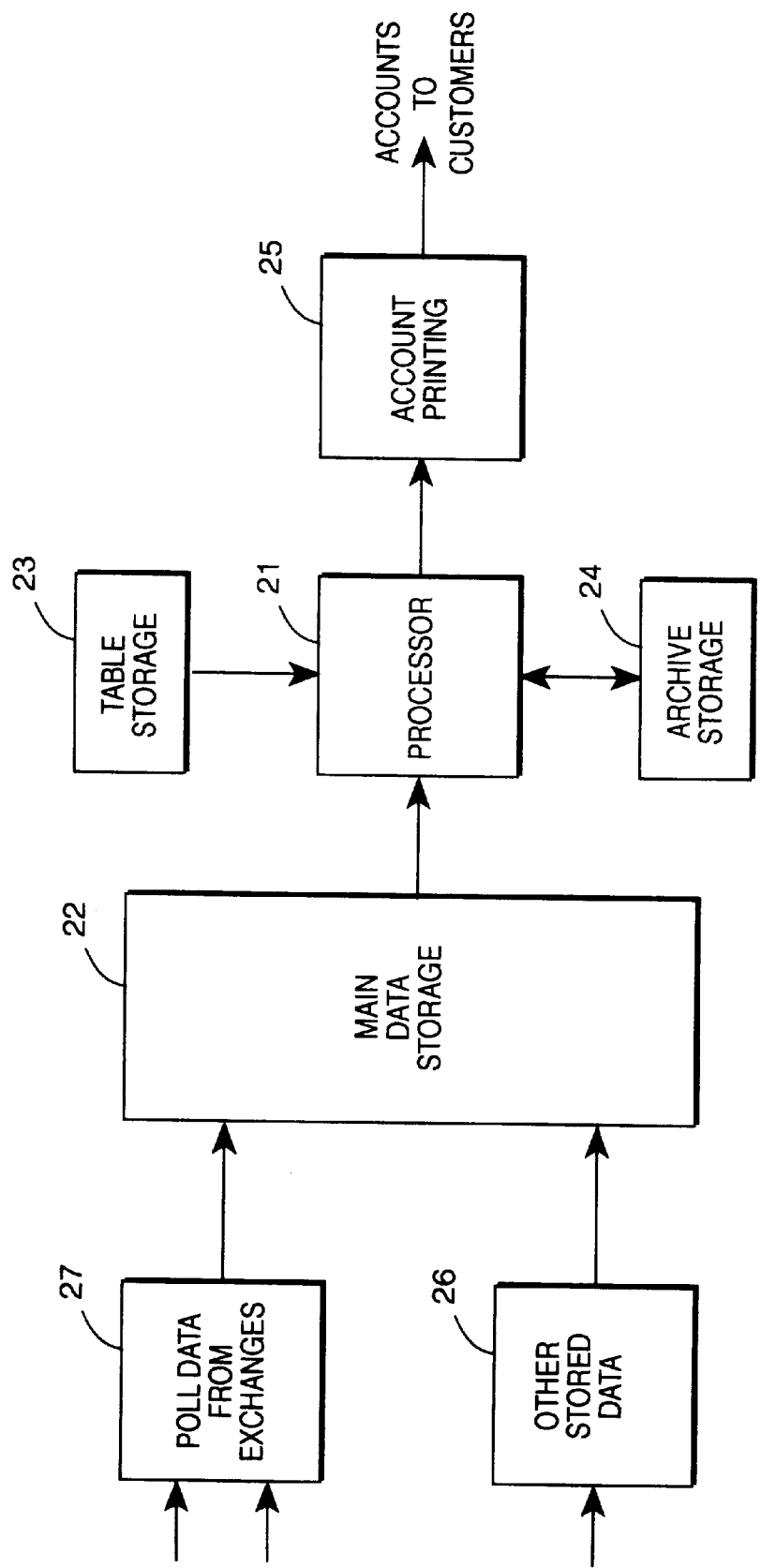
FIG. 2 details processing equipment provided at the charging station illustrated in FIG. 1, including a processor.

The central charging station 18 shown in FIG. 1 is detailed in FIG. 2. The system includes a central processor 21, arranged to receive data relating to customer usage from a main storage device 22, in addition to receiving related data from a storage device 23. The processor 21 is also arranged to supply data to and receive data from an archive storage area 24 and, fundamentally, the processor 21 is arranged to supply print data to accounts printing devices 25 which in turn produce paper accounts for customers.

Non-conventional customer usage information is supplied to the main data storage area 22 from remote storage area 26, arranged to receive details of charge card usage and of other sophisticated charging usage. Conventional charging usage, as previously described, is received from storage device 17 at the local exchanges via a polling device 27, arranged to contact each of the local exchanges, possibly using facilities provided within the network itself and to receive data therefrom relating to usage for particular customers. Thus, under the control of the main co-ordinating processor, not shown, it is determined that a statement of account is to be produced for a particular customer, resulting in data associated with that customer, in the form of the numbers called, duration of call and means by which the call was initiated, being collected in a main data storage area 22.

In response to program control, processor 21 is arranged to analyse the data stored in a main data storage area 22 and provide data which in turn may be supplied to the account printing device 25. Thus, it will be appreciated, that, in addition to calculating the actual charge for the services provided, the processor 21 must also be capable of accurately calculating VAT, in order that said VAT amounts appear on the printed statement of account.

The calculation of VAT in the United Kingdom is a good example of a procedure which may require modification. Furthermore, during initial development work, it is difficult to anticipate all of the variations which may come in the not too distant future. However, if these variations are anticipated, measures may be taken to facilitate adjustment after the code has been embedded within the existing system. For this reason, it is appropriate to develop the code within an environment which facilitates validation exercises, allowing system designers to test possibilities and, as far as possible, anticipate future requirements.

Figure 3:
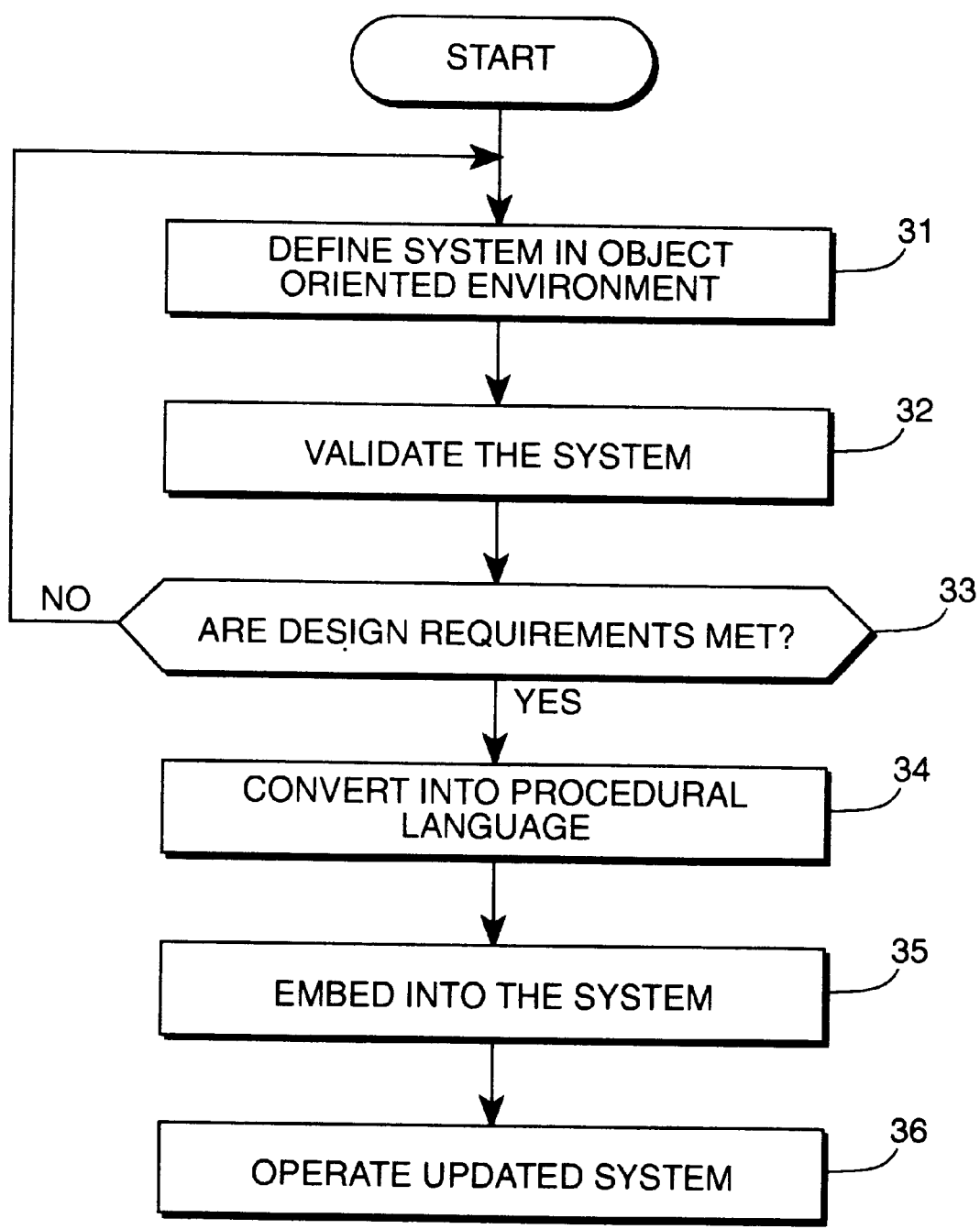
FIG. 3 identifies an overall procedure for modifying an existing procedural system, in accordance with the present invention, comprising a step of defining a system in an object oriented environment, a step of validating the system defined in said environment, and a step of converting the object oriented system into a procedural language.

The overall procedure for modifying an existing procedural system is shown in FIG. 3. At step 32 a new subsystem is defined in an object oriented environment. At the subsystem developed in the object oriented environment is validated. The validation exercise involves performing operations in a similar fashion to that in which they would be performed within the fully operational system. Thus, whereas, in the operational system information is supplied automatically from on-line sources, during the validation exercise at step 32, information may be supplied manually by means of a keyboard etc. The validation exercise allows operators to check that the procedures are being performed in the desired manner. Furthermore, it also provides an environment where new ideas may be tested and experience has shown that the development and anticipation of new procedures is very much an interactive procedure. Thus, given an off-line system upon which validation may be performed, an opportunity is provided for designers and operators to anticipate future demands and to thereby incorporate these options into the system.

Thus, a question is asked at step 33 as to whether all the design requirements have been met. However it should be understood that these design requirements include original design requirements, incorporated into the original system designed and implemented at step 31, in addition to new design requirements which may have been established during the validation procedure performed at step 32. If the question asked at step 33 is answered in the negative, the system is re-designed at step 31 and a validation exercise is executed again at step 32.

Eventually, the question asked at step 33 will be answered in the affirmative, whereafter a conversion procedure is implemented at step 34 to convert the instructions developed within the object oriented environment into a procedural language. Thereafter, at step 35, the procedural language developed at step 34 is embedded into the existing system, thereby allowing said system to operate in its updated form at step 36.

Figure 4:
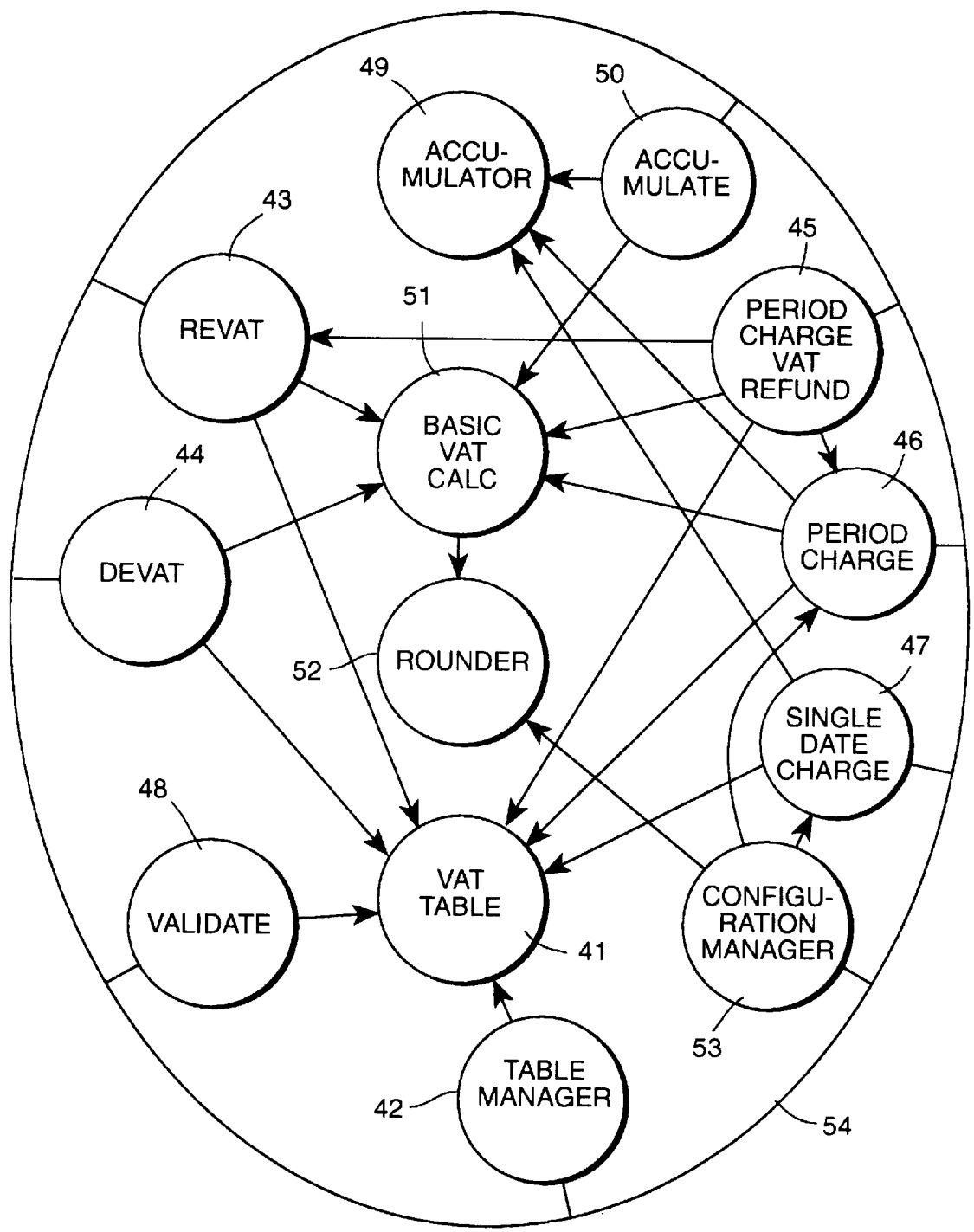
FIG. 4 details an overview of an object oriented system defined in accordance with the procedure identified in FIG. 3.

The VAT processor is defined within an object oriented environment, in which the communication between objects is represented by the diagram shown in FIG. 4. The object oriented environment consists of a VAT TABLE object 41 which in turn communicates with a TABLE MANAGER object 42. Further objects which communicate with the VAT TABLE object 41 are a RE-VAT object 43, a DE-VAT object 44, a PERIOD CHARGE VAT REFUND object 45, a PERIOD CHARGE object 46 and a SINGLE DATE CHARGE object 47. Furthermore, queries are made to the VAT TABLE by means of a VALIDATE object 48.

The accumulation of VAT amounts are made by means of an ACCUMULATOR object 49 and the ACCUMULATOR object 49 interfaces with external commands via an ACCUMULATE object 50. The ACCUMULATE object 50 also communicates with a BASIC VAT CALCULATION object 51, which in turn also communicates with the DE-VAT object 44, the RE-VAT object 43, the PERIOD CHARGE VAT REFUND object 45 and the PERIOD CHARGE object 46. Calculations made by the BASIC VAT CALCULATION object 51 may require rounding, therefore the object communicates with a ROUNDER object 52.

The ACCUMULATOR object 49 communicates with the PERIOD CHARGE object 46 and the SINGLE DATE CHARGE object 47. The PERIOD CHARGE VAT REFUND object 45 communicates with the RE-VAT object 43 and the PERIOD CHARGE object 46, in addition to communicating with the BASIC VAT CALCULATION object 51. A CONFIGURATION MANAGER object 53 communicates with the ROUNDER object 52, the PERIOD CHARGE object 46 and the SINGLE DATE CHARGE object 47.

Many of the objects communicate with an operator, which are referred to as external type objects, including the CONFIGURATION MANAGER object 53, the TABLE MANAGER object 42, the VALIDATE object 48, the DE-VAT object 44, the RE-VAT object 43, the ACCUMULATE object 50, the PERIOD CHARGE VAT REFUND object 45, the PERIOD CHARGE object 46 and the SINGLE DATE CHARGE object 47. Note, different operators would access different interfaces when performing different functions.

Thus, within the object oriented environment, a distinction is made between interfacing external objects and internal objects. When embedded within the existing procedural system, interfacing external objects will provide interfaces to other modules within the system, which may wish to use the services of the processor detailed in FIG. 4. Internal objects support the interface objects and maintain the main attributes of the VAT processor, that is to say, the VAT table, the product table, the customer table, the pair table and the accumulator table. In addition, the internal objects also provide the interface objects with the required processing capacity for accumulating charges, calculating VAT charges and performing VAT validation.

Thus, the outer ring 54 shown in FIG. 4 models the VAT processor. The circles model the objects contained within it; interface objects are connected to the outer ring 54, internal objects are only connected to other objects and an arrow is drawn from one object to another when an object accesses another in order to perform a particular task.

The VAT processor maintains five tables, the VAT table, the product table, the customer table, the pair table and the accumulator table. The first four tables are maintained in the VAT TABLE internal object, while the accumulator table is held by the ACCUMULATOR internal object.

The VAT table lists all existing VAT categories together with the rates that apply to them on the first date for which they were valid, along with any subsequent changes to their rates. For each category a list is maintained of associations, listing the initial date and the rate and any subsequent dates on which their rate is changed, with a new rate that applies from those dates. These elements are placed in such a list in date order. An example of a VAT table is as follows:

| VAT TABLE | |
|---|---|
| S | <(1/1/91,15),(1/4/91,17 5)> |
| P | <(1/1/91,0),(1/4/91,15)> |
| M | <(1/1/91,0),(1/3/92,10)> |
| U | <(1/1/91,6)> |

This table contains four VAT categories, identified as S, P, M and U. The first element of the list associated with a VAT category indicates when that VAT category was first valid. For example, VAT category S was valid from Jan. 1, 1991, when the VAT rate at that date was fifteen percent. The next element of the list for category S indicates that the VAT rate applicable to category S was changed to seventeen point five percent on Apr. 1, 1991. Hence, the rate of fifteen percent applied to S on any date from Jan. 1, 1991 up to and including Mar. 31, 1991.

It is possible to add a new VAT category, resulting in a new element being added to the VAT table. This element contains the name of the new category and a list of associations (date followed by the rate).

Procedures are implemented within the system to check whether a particular VAT category is valid. A VAT category is valid on a particular date if a VAT category is used in the VAT table and if a valid rate is associated with the entry. For example, VAT category P may be considered as being valid on Jan. 1, 1991 but said category was not valid on Dec. 31, 1990. A VAT category is valid over a given period if it is used in the VAT table and if a valid rate is associated with a VAT category for each date covered by this period. Periods are described by their start date and end date and a VAT category is valid over a period if it is valid for each date of said period from its start date and is included up to its end date.

The product table, customer table and pair table relate to product codes, customer classifications and their combinations to VAT categories and the dates from which these VAT categories apply. These three tables are organised to hold a series of keys and they link each of these keys a list of associations identifying the date and VAT category. The keys used in the product table are product codes and the keys used in the customer table are customer classifications, whereas the keys used in the pair table are combinations of product codes and customer classification.

For each key, the tables will maintain a list of associations (identifying date and VAT category) listing the first date on which the key was valid and the VAT category that applied from that date, followed by any subsequent dates on which the associated VAT category changed, with a new category that applied from those dates. The elements in the list are in date order.

The product table, customer table and pair table are similar in style and only differ in the type of keys that are used. They are interpreted and changed in similar ways and the entries may be used to perform validation checks. An example of a product table is as follows:

| PRODUCT TABLE | |
|---|---|
| phone | <(1/1/93, S)> |
| fax | <(1/1/93, S)> |
| pager | <(1/5/93/ S),(1/7/93, P)> |

The first element of the list associated with a product code identifies when that product was first valid. For example, product code "phone" was valid from Jan. 1, 1993. The VAT category that applied to product "phone" on that date was S. Product code "pager" was first valid on May 1, 1993 under VAT category S. The next element of the list for "pager" indicates that the VAT category applicable to "pager" was changed to P on Jul. 1, 1993. Hence, the category S applied to pagers on any date from May 1, 1993 up to and including Jun. 30, 1993.

An example of a customer table is as follows:

| CUSTOMER TABLE | |
|---|---|
| OAP | <(1/1/93, S)> |
| business | <(1/4/93, P)> |

This table contains two customer classifications, namely "Old Age Pensioner" and "Business". It is interpreted like the product table identified above, that is to say, the first element of the list associated with a customer classification identifies when that product was first valid. Subsequent elements list changes to the applicable VAT category and the dates on which those changes took effect.

An example of a pair table is as follows:

| PAIR TABLE | |
|---|---|
| phone x OAP | <(1/1/93, S)> |
| phone x business | <(1/7/93, U)> |

It is interpreted in a substantially similar way to the product table identified above.

The ACCUMULATOR object holds the accumulation of single date charges and period charges. Each information item consists of a VAT rate and a VAT exclusive amount and the accumulator table holds the information items.

The following table is an example of an accumulator table:

| ACCUMULATOR TABLE | |
|---|---|
| Vat Rate | excl. amount |
| 15.00 | 87.72 |
| 17.50 | 199.83 |
| 00.00 | 65.00 |

In order to accumulate a VAT exclusive amount, it is added to the VAT exclusive amount of the information item in the accumulated table and is associated with a rate that applies to the given amount. If no such information item exists in the accumulated table, a new information item is added to the table. This item associates the VAT exclusive amount that is to be accumulated with the rate that applies to it. Thus, it can be appreciated that the re-setting of the accumulator table effectively removes all numerical data stored therein. VAT rates are created as an item when they are required and thereafter VAT exclusive amounts are accumulated within the associated item.

The system can be used for four distinct operations. Firstly, it can be used to perform a charging operation used to prepare a customer's bill, involving the working out of VAT amounts. Secondly, the system can be used to process receipts, from customers. Thirdly, the system can be used for a general enquiry made by operators when information is required concerning VAT amounts, and fourthly, the system is designed such that rconfigurations may be made, particularly when changes occur to the way in which VAT is calculated.

All of the objects detailed in FIG. 4 are not necessarily employed for each of the above defined operations. The four operations will therefore be described with reference to specific drawings, in which the objects actually employed within the system defined in FIG. 4 are repeated in FIGS. 5 to 8, although it should be appreciated that the objects identified in FIG. 5 to 8 are identical and form part of the structure defined in FIG. 4.

Figure 5:
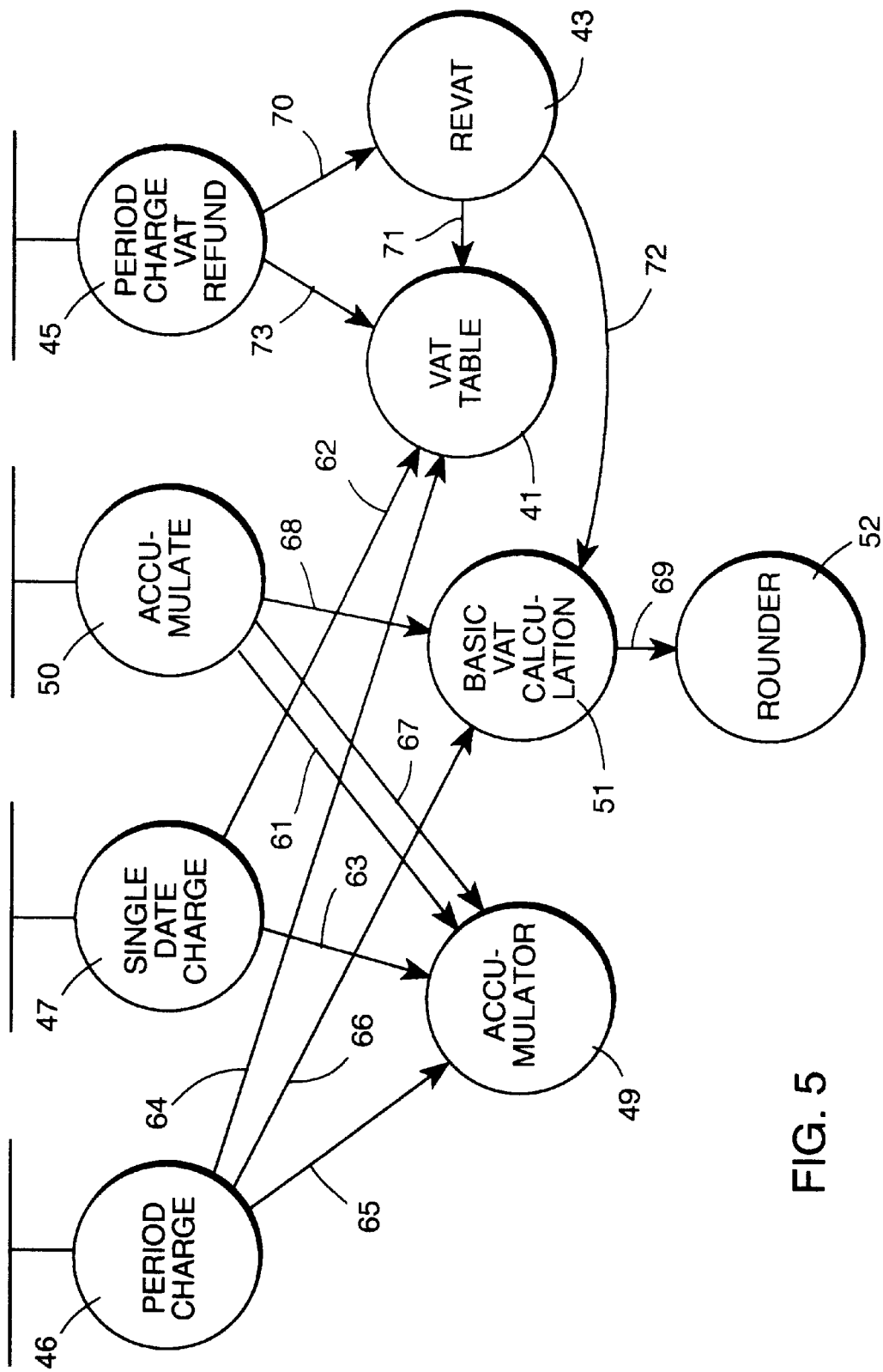
FIG. 5 details part of the system shown in FIG. 4.

FIG. 5 details the operations performed during the charging process, that is to say, when a customer's bill is being made up.

A typical procedure for bill production for a particular customer will be for access to the system being provided via the ACCUMULATE object 50.

Communication task 61 represents an operation performed by the ACCUMULATE object 50 so as to reset the value stored by the ACCUMULATOR object 49.

Thus, input data will consist of any chargeable item for which it is necessary to calculate VAT before this item may be added to a bill although, it should be appreciated, that some items may be zero rated or exempt from VAT and this will be taken into account during the VAT processing procedure.

VAT may be accumulated in two specific ways. Firstly, VAT may be incurred on a transaction which takes place at a particular point in time and is therefore processed as a single date charge. Alternatively, VAT is also incurred through services which are provided over a period of time and are therefore processed as a period charge. It is important to separate single date transactions from period charges primarily because it is possible that the VAT rate may change over the period under consideration.

In order to calculate VAT for an item for which a transaction has occurred on a particular date, access is provided to the SINGLE DATE CHARGE object was incurred. In accordance with Policies specified within the SINGLE DATE CHARGE object 47, a call is made to the VAT table 41, illustrated by task 62, which in turn returns a VAT rate to the SINGLE DATE CHARGE object 47. After receiving the appropriate VAT rate from the VAT TABLE object 41, the amount, exclusive of VAT, is supplied to the ACCUMULATOR object 49. The ACCUMULATOR object 49 includes a plurality of accumulators, each associated with a particular VAT rate. Thus, the VAT exclusive amount supplied to the ACCUMULATOR object 49, via the task identified as 63, also includes an identification of the applicable VAT rate, such that the ACCUMULATOR object 49 accumulates the VAT exclusive amount in the accumulation area specified for the particular VAT amount supplied from the SINGLE DATE CHARGE object 47.

In some circumstances, it may be necessary for the SINGLE DATE CHARGE object 47 to make more than one call to the VAT TABLE object 41. For example, it may be possible to base VAT on the date on which the transaction occurred or, alternatively, it is possible to base VAT on the date of the bill. A further coniplication arises if the policy is selected in response to some other variable.

The PERIOD CHARGE object 46 is similar to the SINGLE DATE CHARGE object 47, although it is capable of processing charges which occur over a period of time. The way in which period charges are actually calculated is again a matter of policy and many variations are possible. Thus, in accordance with the selected policy, it is possible to base VAT charges over a period on the start date, the end date, either of these in response to another variable or, in a more sophisticated environment, to have VAT amounts apportioned over the period concerned. When the apportionment policy is in operation, it is necessary for the PERIOD CHARGE object 46 to supply a start date and an end date via a task indicated as 64 to the VAT TABLE object 41. The VAT TABLE object 41 is then arranged to apportion the VAT exclusive amount over the period concerned and to identify the VAT rate applicable to the apportioned amounts. Thus, the VAT exclusive amounts are then accumulated in the ACCUMULATOR object 49 via task 65, in accordance with the VAT rates supplied by the VAT TABLE object 41.

The BASIC VAT CALCULATION object 51 is essentially provided to calculate the final VAT amounts. However, under some situations, it may be necessary to calculate actual VAT amounts in order to determine which of a plurality of possible algorithms is to be selected. Thus, it is possible for the PERIOD CHARGE object 46 to supply data over line 66 to the BASIC VAT CALCULATION object 51 which in turn returns VAT amounts to the PERIOD CHARGE object 46, allowing it to make decisions as to which is the preferred algorithm.

When all of the relevant data has been supplied to the system, an indication is made via the ACCUMULATE object 50 to the effect that the VAT amounts are to be calculated. The ACCUMULATE object 50 makes a call to the ACCUMULATOR object 49, via task line 67, effectively enquiring as to the status of the ACCUMULATOR object at that point in time. Thus, in response to this enquiry, data accumulated in the ACCUMULATOR object 49 is supplied back to the ACCUMULATE object 50 which in turn supplies this information, via task 68, to the BASIC VAT CALCULATION object 51. Thus, in response to this data, supplied from the ACCUMULATE object 50, the BASIC VAT CALCULATOR object 51 determines VAT amounts from the VAT exclusive amounts and tne VAT rates stored in the ACCUMULATOR object 49. A special case arises concerning items which are VAT exempt or have a VAT rate of zero, to ensure that the BASIC VAT CALCULATION object does not multiply VAT exempt amounts by zero. Actual VAT amounts calculated by the BASIC VAT CALCULATOR object 51 are supplied to the ROUNDER object 52 identified as task 69, which rounds these values in accordance with current policy. Thus, for example, all VAT amounts generated by the basic VAT calculator may be truncated to a predetermined number of decimal places, thus these truncated values would then be supplied back to the BASIC VAT CALCULATOR object 51. Thereafter, the VAT amounts are returned back to the ACCUMULATE object 50.

Under some circumstances it may be necessary to give a customer a VAT refund. In particular, this occurs when a service has been paid for in advance and the VAT rate for that particular service has been reduced over the period concerned. Under these circumstances, an operator supplies data to the PERIOD CHARGE VAT REFUND object 45, which is an object configured so as to inherit all the functionality of the PERIOD CHARGE object 46. The first operation performed by the PERIOD CHARGE VAT REFUND object 45 is to calculate the value of VAT previously charged, by calling the RE-VAT object 43, identified as task 70. The data supplied to the RE-VAT object 43 comprises a VAT exclusive amount and a VAT category or a customer or service classification. The RE-VAT object 43 makes a call to the VAT TABLE object 41 via task 71 which in turn returns the appropriate VAT rate for the item under consideration. This information is then supplied from the RE-VAT object 43 to the BASIC VAT CALCULATION object 51 via task 72, which in turn returns the associated VAT amount. This value is then returned to the PERIOD CHARGE VAT REFUND object 45. Subject to appropriate policy definitions being stored within the PERIOD CHARGE VAT REFUND object 45, a further call is made by said object 45 to the VAT TABLE object 41 via task 73, in order to determine the VAT rate which would be charged at the present time. Again, this information is then relayed to the BASIC VAT CALCULATION object 51 to return the actual VAT amount. A comparison is then made of the VAT which was charged with the VAT which would be charged at the present time and if the new value is lower than the actual value charged, details of an appropriate refund are returned to the operator.

Figure 6:
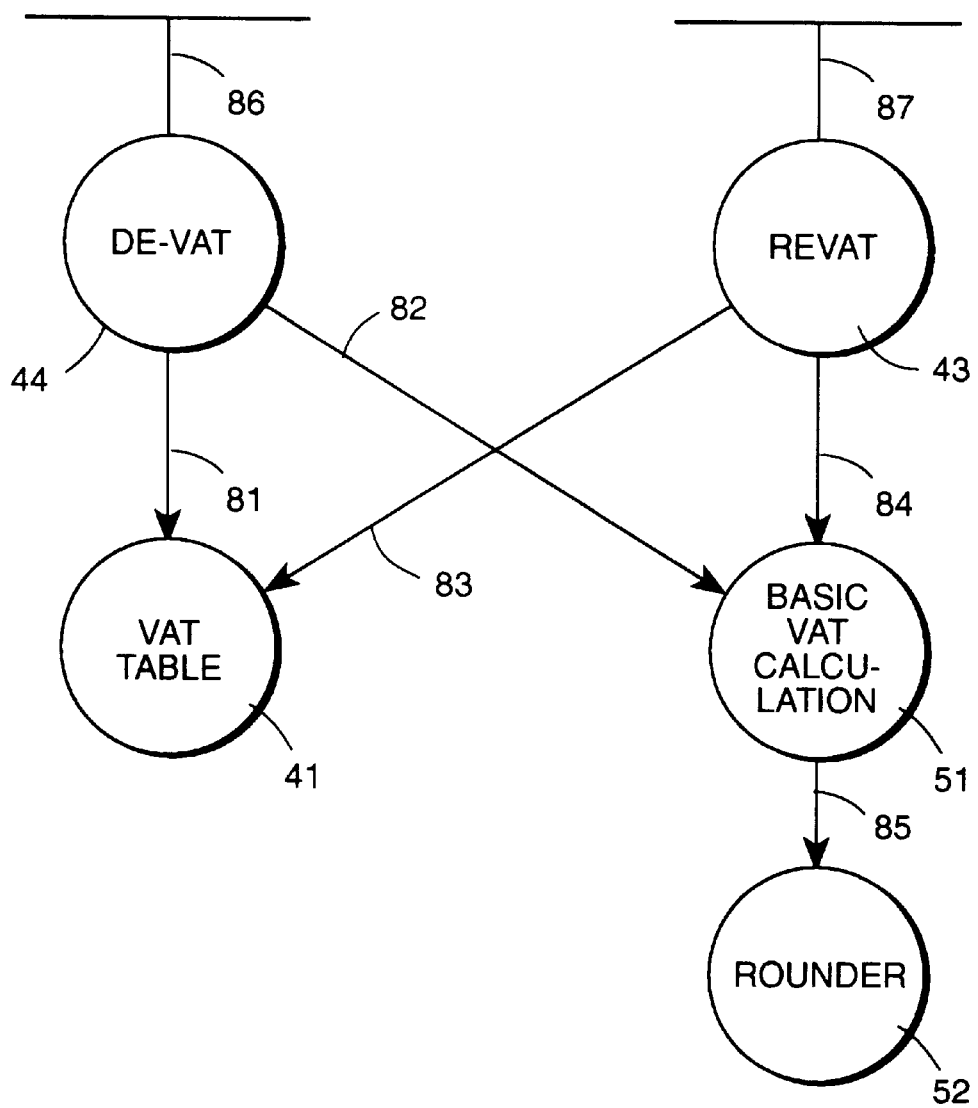
FIG. 6 details part of the system shown in FIG. 4.

The description above relates to the generation of bills which include VAT amounts. The system is also configured to take account of VAT transactions when payments are made. In particular, it is possible for payments to be made without making specific reference to a particular bill. Under these circumstances, it is not immediately apparent as to what proportion of the bill relates to an actual charge and what proportion relates to VAT payable to Customs & Excise. Thus, under these circumstances, it is necessary to divide a total amount into the non-VAT amount and the VAT amount. In dealing with receipts, it is also sometimes necessary to calculate a VAT amount from a VAT exclusive amount. Procedures for implementing such actions are shown in FIG. 6. If an operator has an amount which is inclusive of VAT and it is desired to obtain the value exclusive of VAT, an input is supplied to the DE-VAT object 44. A call is then made, identified by task 81, to the VAT TABLE object 41. The DE-VAT object 44 supplies information identifying the tax point date and the classification, whereupon the VAT TABLE object 41 returns the VAT rate applicable to that transaction. This information is then supplied to the BASIC VAT CALCULATION object 51 via task 82. In response to this call, the BASIC VAT CALCULATION object 51 returns the VAT exclusive amount and the amount of VAT paid. These values are calculated with a call, where appropriate, to the ROUNDER object 52 via task 85. Thus, the DE-VAT object 44 has received a VAT rate from the VAT TABLE object 41, and the VAT exclusive rate and the VAT amount from the BASIC VAT CALCULATOR object 51. This information is now returned to the operator via the interface identified as 86.

In addition to calculating VAT exclusive values from inclusive values, operators dealing with receipts can also re-calculate VAT when given a VAT exclusive value. The VAT exclusive value, along with details of the date of the transaction and the transaction type result in a call over interface 87 to the RE-VAT object 43. The RE-VAT object 43 makes a call, via task 83, to the VAT TABLE object 41, which in turn returns the appropriate VAT rate. The RE-VAT object 43 then calls the BASIC VAT CALCULATION object 51, identified by task 84, which in turn returns the VAT amount. Thus, the RE-VAT object 43 returns over interface 87, the VAT rate, the VAT amount and the VAT inclusive value.

Figure 7:
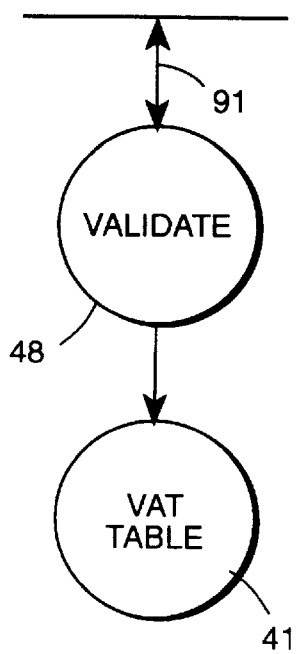
FIG. 7 details part of the system shown in FIG. 4.

In addition to generating VAT bills and processing receipts, general enquiries may be made to access the information stored in the VAT table as illustrated in FIG. 7. A VAT TABLE enquiry results in a call to the VALIDATE object 48 via an interface 91. In response to the enquiry made to the VALIDATE object 48, a call is made to the VAT TABLE object 41 and the appropriate information is returned to the VALIDATE object 48, whereafter it is relayed over the interface 91 to the operator.

An advantage of the present embodiment is that it is configured such that amendments can be made to the way in which VAT calculations are executed. In particular, it is possible to update the VAT TABLE object 41, and make modifications to the ROUNDER object 52, the PERIOD CHARGE object 46 and the SINGLE DATE CHARGE object 47.

Figure 8:
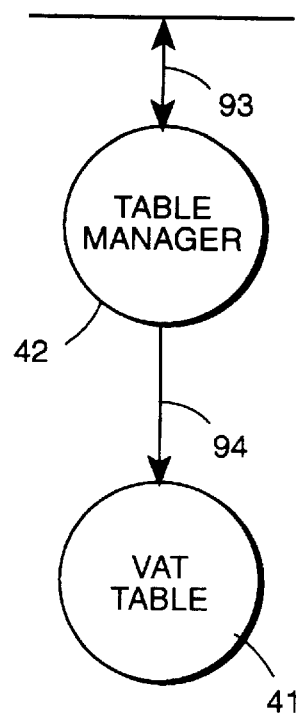
FIG. 8 details part of the system shown in FIG. 4.

As shown in FIG. 8, modifications to the VAT TABLE object 41 are made via the TABLE MANAGER object 42. An operator is given access to the TABLE MANAGER object 42 via an interface 93 and updates for the VAT TABLE are thereafter supplied from the TABLE MANAGER object 42 over a link 94 to the VAT TABLE object 41.

Figure 9:
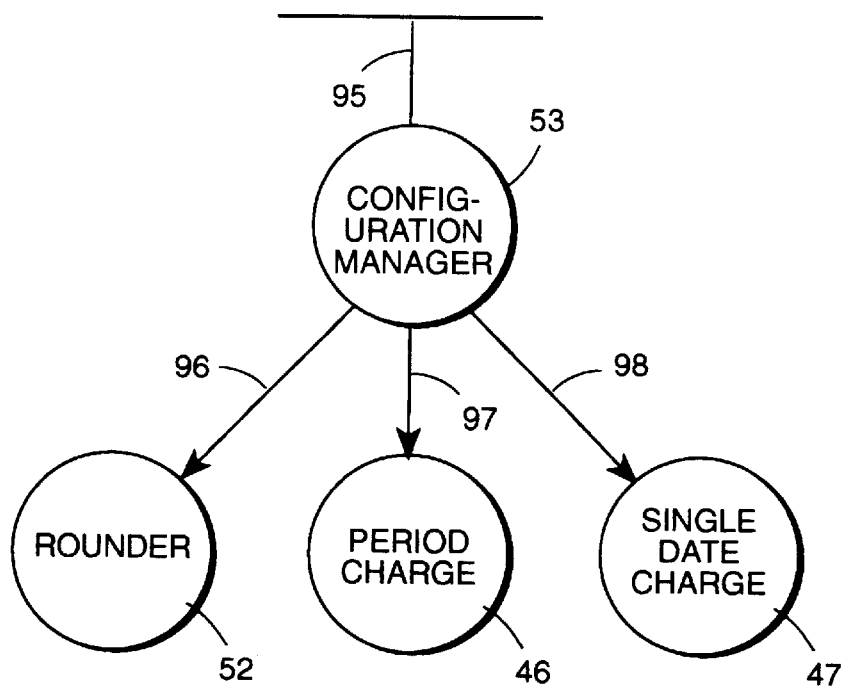
FIG. 9 details part of the system shown in FIG. 4.

Similarly, as shown in FIG. 9, an interface 95 to the CONFIGURATION MANAGER object 53 facilitates modifications being made to the ROUNDER object 52 via a link 96, the PERIOD CHARGE object 46 via a link 97 and the SINGLE DATE CHARGE object 47 via a link 98.

The individual objects within the object oriented environment will now be considered in detail.

TABLE MANAGER

The table manager 42 controls configuration operations relating the changing of entries in the VAT table and the product table.

A first function performed by the table manager adds a given VAT category to the VAT table, with the given VAT rate to apply from the given date. If the given VAT category is already used in the VAT table, an appropriate message is returned and the VAT table is left unchanged.

A second function adds a given product code to the product table, with the given VAT category, to apply from the given date. If the given product code is already used in the product table, an appropriate message is returned and the product table is left unchanged.

A third function adds a given customer classification to the product table, with a given VAT category to apply from the given date. If a given customer classification is already used in the customer table, an appropriate message is returned and the customer table is left unchanged.

A fourth function adds the given combination of product code and customer classification to the pair table, with a given VAT category to apply from the given date. Again, if the given combination is already used in the pair table, an appropriate message is returned and the pair table is left unchanged.

A fifth function changes the VAT table to indicate that the given VAT rate will be the new VAT rate to apply to the given VAT category from the given date. If the given VAT category is not used in the VAT table, an appropriate message is returned and the VAT table is left unchanged.

A sixth function changes the product table to indicate that the given VAT category will be the new VAT category to apply to the given product code from the given date. If the given product code is not used in the product table, an appropriate message is returned and the product table is left unchanged.

A seventh function changes the customer table to indicate that the given VAT category will be the new VAT category to apply to the given customer classification from the given date. If the given customer classification is not used in the customer table, an appropriate message is returned and the customer table is left unchanged.

An eighth function changes the pair table to indicate that the given VAT category will be the new VAT category to apply to the given combination of product code and customer classification from the given date. If the given combination is not used in the pair table, an appropriate message is returned and the pair table is left unchanged.

A ninth function changes the VAT table to indicate that the given VAT category is no longer valid from the given date. If the given VAT category is not used in the VAT table, an appropriate message is returned and the VAT table is left unchanged.

A tenth function changes the product table to indicate that the given product code is no longer valid from the given date. If the given product code is not used in the product table, an appropriate message is returned and the product table is left unchanged.

An eleventh function changes the customer table to indicate that the given customer classification is no longer valid from the given date. If a customer classification is not used in the customer table, an appropriate message is returned and the customer table is left unchanged.

A twelfth function changes the pair table to indicate that the given combination of product code and customer classification are no longer valid from the given date. If the given combination is not used in the pair table, an appropriate message is returned and the pair table is left unchanged.

RE-VAT

The RE-VAT object controls operations requested by receipts when it is necessary to re-calculate a VAT amount.

A first function calculates the VAT amount that applies to the given net amount on the given date for the given VAT category. This VAT amount is returned, together with the gross amount and the VAT rate which applies to that given amount.

A second function calculates the VAT amount that applies to the given net amount on the given date for the given product code. The function returns this VAT amount, together with the gross amount and the VAT rate that applies to that amount.

A third function calculates the VAT amount that applies to the given net amount on the given date for the given customer classification. The function returns this VAT amount, together with the gross amount and the VAT rate that applies to the given amount.

A fourth function calculates the VAT amount that applies to the given net amount on the given date for the given combination of product code and customer classification. The function returns this VAT amount together with the gross amount and the VAT rate that applies to the given amount.

DE-VAT

This object controls operations requested by receipts concerning the removal of VAT amounts, referred to herein as DE-VATING.

A first function calculates the VAT amount and the net amount that together form a given gross amount, using the given VAT category and date. The function returns the VAT amount and the net amount and the VAT rate that applies to the given amount.

A second function calculates the VAT amount and the net amount that together form the given gross amount, using the given product code and date. The function returns the VAT amount and the net amount and the VAT rate that applies to the given amount.

A third function calculates the VAT amount and the net amount that together form the given gross amount, using the given customer classification and date. The function returns the VAT amount and the net amount and the VAT rate that applies to the given amount.

A fourth function calculates the VAT amount and the net amount that together form a given gross amount, using the given combination of product code, customer classification and date. The function returns the VAT amount and the net amount and the VAT rate that applies to the given amount.

PERIOD CHARGE VAT REFUND

The PERIOD CHARGE VAT REFUND object 45 controls operations requested by billing operators concerned with calculating refunds applicable to period charges that have been paid for in advance but to which different (usually smaller) VAT amounts would apply had they been charged after the period, on the current bill.

The functions available within this object first of all calculate the VAT amount that was originally charged. Next, the VAT amount is calculated that would apply to the period charge if it had been included on the current bill. These two charges are compared and if the originally charged VAT amount is larger than the VAT amount applicable on the current bill date, the difference between the amounts is returned. This is the VAT refund that is applicable to this period charge. If the original VAT amount is less than the new VAT amount, a zero is returned, indicating that no VAT needs to be refunded. If, however, there is no valid rate associated with this amount on the given original tax date , an appropriate message is returned instead.

A first function calculates a VAT refund for a period charge that has been paid for in advance but which may have attracted a different (smaller) amount of VAT had it been charged at the rate applicable for the period of the current bill. If, however, there is no valid rate associated with this amount on the original tax date, an appropriate message is returned.

A second function implements a similar procedure but related to a product code, while a third is related to a customer code and a fourth is related to a product-customer combination.

PERIOD CHARGE

The PERIOD CHARGE object 45 controls operations requested by billing operators concerned with the accumulation of period charges.

A first function calculates the VAT rates that apply to the given VAT exclusive amounts, using the given VAT category, period start date and period end date, following the current favor policy. The function accumulates the VAT exclusive amount in the accumulated table at the appropriate rates.

A second function calculates the VAT rates that apply to the given VAT exclusive amounts, using the given product code, period start date and period end date following the current favor policy. The function accumulates the VAT exclusive amount in the accumulator table at the appropriate rates.

Figure 10:
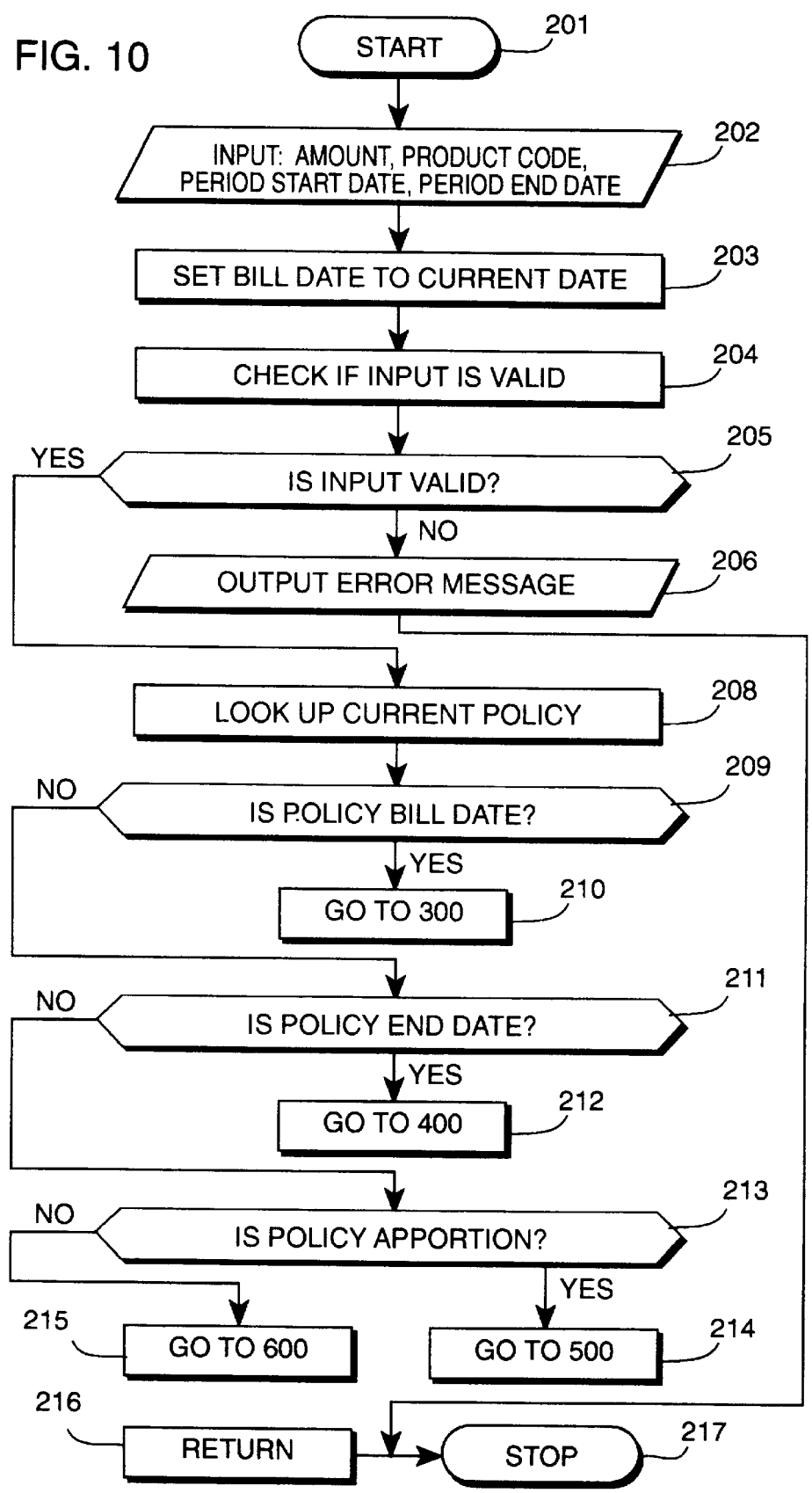
FIG. 10 details the function for calculating VAT rates given to VAT exclusive amounts.

This second function is detailed in FIG. 10. The function is initiated at step 201 and at step 202 an input is received which identifies the VAT exclusive amount, the product code, the period start date and the period end date. At step 203 a bill date is set to the current date, given that this is the date on which the bill is being calculated.

At step 204 an enquiry is made to the VAT table to check whether the input data received at step 202 is valid. Thus, a question is asked at step 205 as to whether the data was valid and if this question is answered in the negative, an output error is generated at step 206 and the process terminates at step 217. If the question asked at step 205 is answered in the affirmative, an enquiry is made at step 208 as to the status of the current policy, which may be answered in four possible ways. Firstly, the policy may set that over a period charge the VAT is calculated with respect to the bill date. Secondly, VAT could be calculated with respect to the end date of the period under consideration. Thirdly, the VAT could be apportioned over the period of consideration or fourthly, the VAT could be charged at a rate selected in response to another variable.

Figure 11:
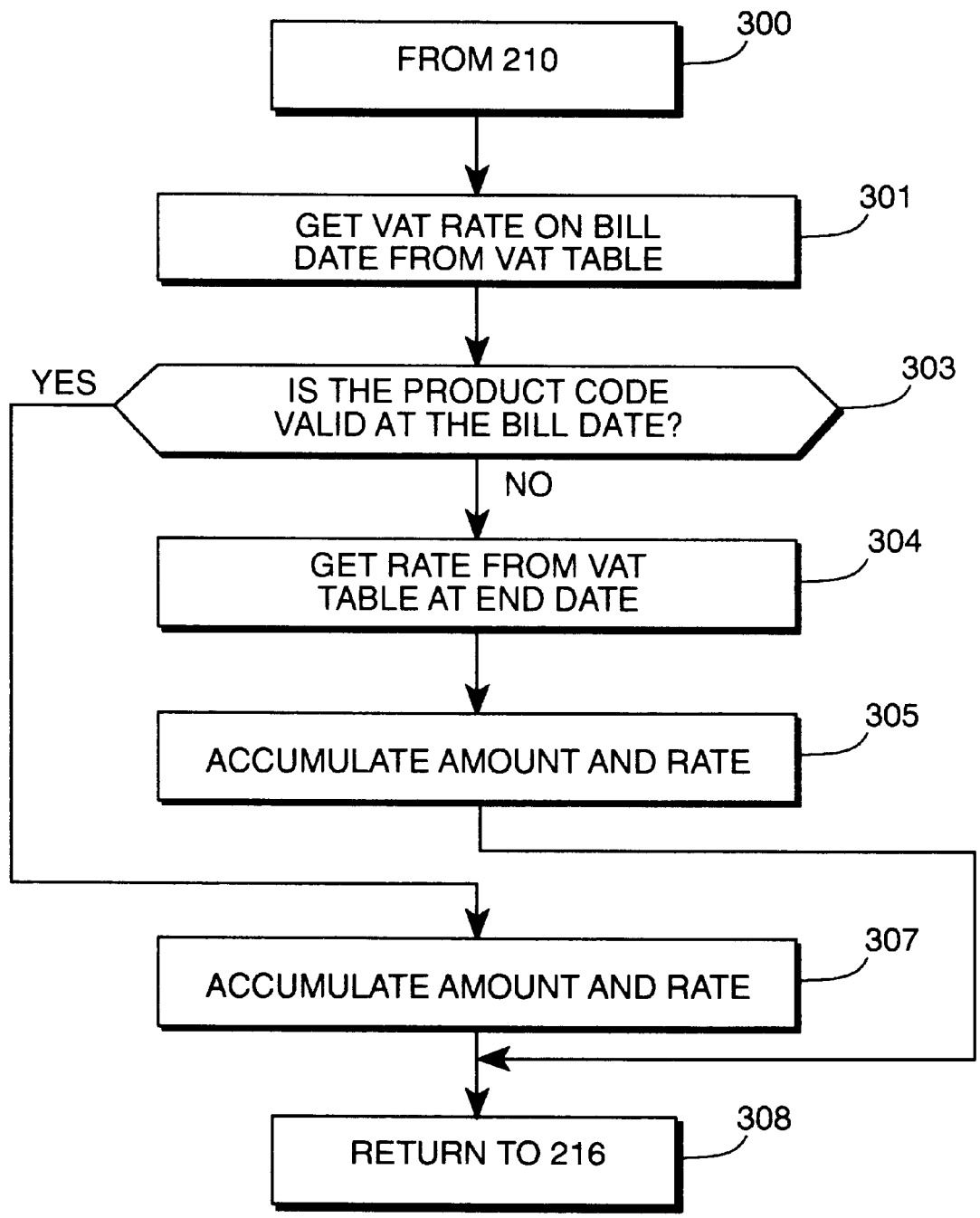
FIG. 11 is an expansion of the procedure shown in FIG. 10.

Referring to FIG. 11, the procedures carried out in response to the first selected policy, that is to say, VAT is charged with respect to the bill date (if yes at 209, otherwise, go to step 211), is initiated at step 300 entered via block 210 of FIG. 10. At step 301 the VAT rate is obtained from the VAT table. A check is then made as to whether the product code is valid at the bill date. Thus, a question is asked at step 303 as to whether the product code is valid and if this question is answered in the negative the appropriate VAT amount is selected from the VAT table at step 304, based upon the end date. Thus, at step 305 VAT is calculated with reference to the rate at the end date and the process is terminated at step 308 by return to block 216 of FIG. 10.

If the question asked at step 303 is answered in the affirmative, the rate determined at the bill date is implemented at 307 in order to calculate the VAT amount whereafter the process terminates at step 308.

Figure 12:
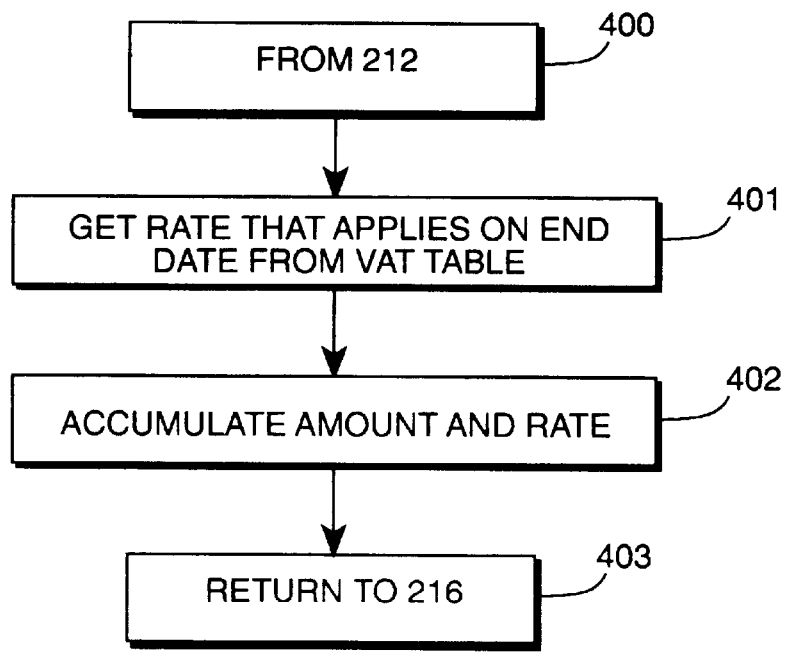
FIG. 12 details the procedure for calculating a rate determined at the end of a charging period.

Referring to FIG. 12, the procedures performed in response to the second policy option at step 211, that is to say, that the VAT rate is that determined at the end of the period, is initiated at step 400 entered via 212 (if yes at 211, otherwise, go to 213). At step 401 the rate is obtained from the VAT table, applicable at the end of the period under consideration. Thereafter, the amount and rate is accumulated at step 402 and the process terminates at step 403.

Figure 13:
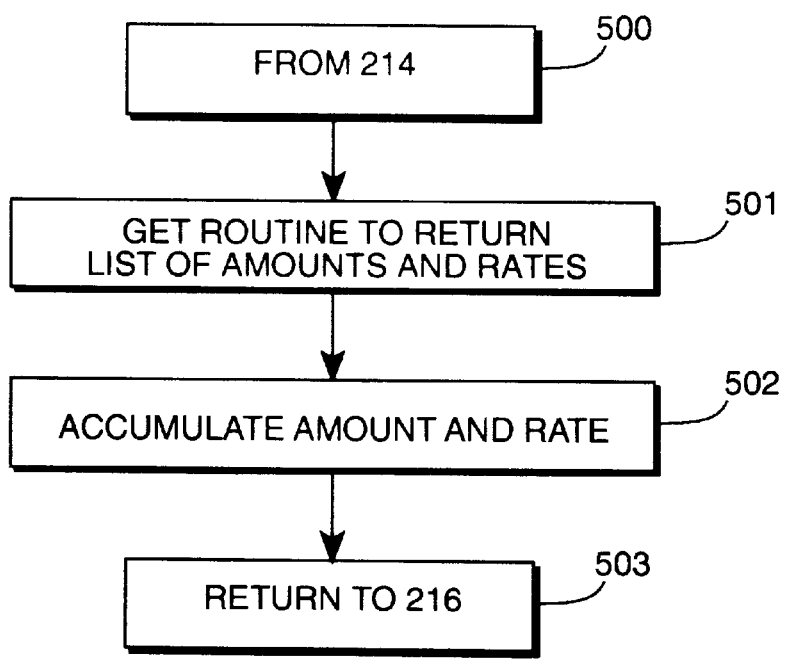
FIG. 13 details the procedure when the rate is apportioned over a period.

Referring to FIG. 13, the procedures implemented in response to the third policy option at step 213, that is to say, the VAT rate is apportioned over the period, is detailed at step 500 entered via block 214 of FIG. 10 (if yes at 213, otherwise, go to 215).

At step 501 a function (or routine) is called, which returns with a list of amounts and the rates which apply to them. These amounts are thereafter accumulated at step 502 and the process terminates at step 503.

Figure 14A:
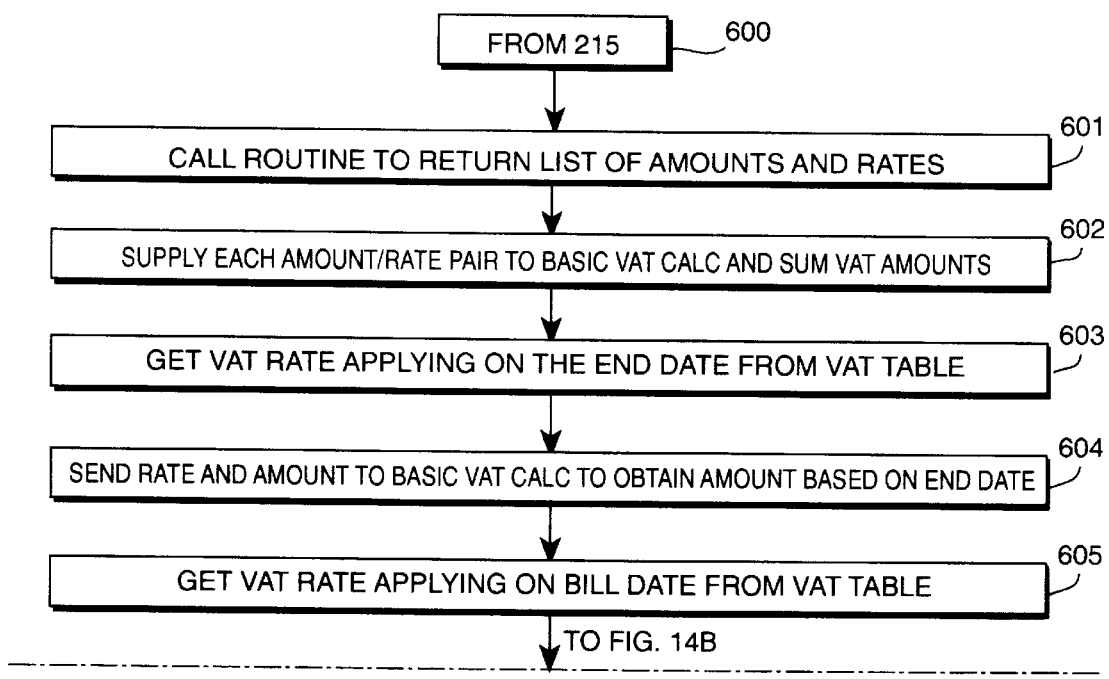
FIG. 14 details the procedure when a charge is made on the basis most favourable to a customer.

Referring to FIG. 14, the procedures for the fourth policy option at step 213, that is that none of the three preceding policies applies, are detailed from step 600 entered via block 215 of FIG. 10. At step 601 a call is made to a function which returns a list of amounts and rates which apply to them. At step 602 each of the possible amounts and rates are supplied to the BASIC VAT CALCULATION object 51 which in turn returns VAT amounts. The amounts returned from the VAT CALCULATION object are summed for subsequent comparison.

Having determined the VAT amounts applicable over a period, other means by which the VAT could be calculated are determined, in order that these may be compared. Thus, at step 603 the VAT rate applicable at the end date is obtained from the VAT table, whereafter, at step 604, the rate read from said table at step 603 along with the exclusive amount is supplied to the basic VAT calculation object to obtain the amount of VAT applicable based upon the end date.

Step 605 initiates the calculation of VAT applicable at the bill date. At this step, the VAT rate applicable at the bill date is read from the VAT table and a question is then asked at step 606 as to whether the category is valid at the date of the bill. If this question is answered in the negative, the selected mode of billing is taken from the other two options available within this procedure. Thus, a question is asked at step 607 as to whether the sum derived a step 602 is less than the amount derived at step 604. If this question is answered in the negative, meaning that the amount derived at step 604 is the smaller and is therefore the amount to be charged to the customer, an accumulation is made of the exclusive amount at step 608, along with an indication of the rate applicable at the end date. Thereafter, the procedure terminates at step 609. Alternatively, if the question asked at step 607 is answered in the affirmative, to the effect that the sum derived at step 602 is less than the amount derived at step 604, the list derived at step 601 is accumulated at 610 and the procedure terminates at step 609.

Alternatively, the question asked at step 606 may be answered in the affirmative, to the effect that the code identified at step 605 is valid. Consequently, at step 611 the amount and rate applicable at the bill date are sent to the basic VAT calculator to determine the VAT amount. Thereafter, at step 612 a comparison is made of the sum calculated at step 602 and the amounts derived from step 611.

If the question asked at step 612 is answered in the affirmative, to the effect that the amount calculated at step 602 is the smaller, the list of values returned at step 601 are accumulated at 613 and control is directed to step 609. If, however, the question asked at step 612 is answered in the negative, control is directed to step 614.

At step 614 a question is asked as to whether the amount calculated at step 604 is smaller than the values determined at step 611. If this question is answered in the affirmative, control is directed to step 615, whereupon the amount of VAT applicable at the end date is accumulated. Alternatively, if the question asked at step 614 is answered in the negative, the amount applicable at the bill date is accumulated at step 616. After both steps 615 and 616, control is directed to step 609.

SINGLE DATE CHARGE

The SINGLE DATE CHARGE object 47 controls requests by billing operators concerned with accumulating single date charges. A total of eight functions are available within the object.

For the first four functions, a VAT exclusive amount is stored in the accumulator table. The given amount must be a positive or zero amount and relates to a debit for a single charge related to a purchase on the given charge date. If, however, there is no valid rate associated with this single date charge following the current favor policy, no amount is accumulated and an appropriate message is returned.

If the current favor policy is to calculate VAT in relation to the date on which the transaction took place, the given amount is accumulated at the VAT rate that applied to the charge on the given charge date. Alternatively, if the current favor policy specifies that VAT is calculated at the bill date, the amount is accumulated at the VAT rate applicable to the charge on the date of the current bill. If there is no valid rate associated with the charge on the current bill date, the amount is accumulated at the rate that applied on the given charge date.

If the current favor policy is such as to make a charge in dependence upon another variable the amount is accumulated on either the bill date or the charge date, dependent upon said variable.

A first function calculates the VAT rate that applies to the given VAT exclusive amount, using the given VAT category and charge date, following the current favor policy. The function accumulates the VAT exclusive amount in the accumulator table at the appropriate rate.

A second function calculates the VAT rate that applies to the given VAT exclusive amount, using the given product code and the charge date, following the current favor policy. The function accumulates the VAT exclusive amount in the accumulator table at the appropriate rate.

A third function calculates the VAT rate that applies to the given VAT exclusive amount, using the given customer classification and charge date, following the current favor policy. The function accumulates the VAT exclusive amount in the accumulator table at the appropriate rate.

A fourth function calculates the VAT rate that applies to the given VAT exclusive amount, using the given combination of product code and customer classification and the given charge date, following the current favor policy. The function accumulates the VAT exclusive amount in the accumulator table at the appropriate rate.

Functions 5 to 8 store a given VAT exclusive amount, which is a VAT credit, in the accumulator table. The given amount must be a negative or zero amount and relates to a credit for a single charge that was charged earlier on a bill issued on the given original bill date. If, however, there is no valid rate associated with a single date credit, following the current favor policy, no amount is accumulated and an appropriate message is returned.

Should legislation change, resulting in a change of the current favor policy to "charge at the date of the transaction", the function calculates the option which would have yielded the highest VAT amount applicable at the date of charge, had it been applied on the given original bill date. The credit is accumulated in the accumulator as if it were applied on the given original bill date.

Again, should legislation change, resulting in a change of the current favor policy to "calculate charges in relation to the date of the bill", the given amount is accumulated at the VAT rate that applied to the credit on the current bill date. If there is no valid rate associated with the charge on the current bill date, the function calculates which favor policy would have yielded the highest VAT amount applicable to the single date charge, had it been applied on the given original bill date. The credit is then accumulated in the accumulator following this policy as if it was applied on the given original bill date.

It will be appreciated that provision is made in anticipation of changes in legislation and user guides would be provided to identify current acceptable modes of operation.

The fifth function within this object calculates the VAT rate that applies to the given VAT exclusive amount, using the given VAT category, charge date and original bill date, following the current favor policy. The function accumulates the VAT exclusive amount in the accumulator table at the appropriate rate.

The sixth function calculates the VAT rate that applies to the given VAT exclusive amount, using the given product code, charge date and original bill date, following the current favor policy. The function accumulates the VAT exclusive amount in the accumulator table at the appropriate rate.

The seventh function calculates the VAT rate that applies to the given VAT exclusive amount, using the given customer classification, charge date and original bill date, following the current favor policy. The function accumulates the VAT exclusive amount in the accumulator table at the appropriate rate.

The eighth function calculates the VAT rate that applies to the given VAT exclusive amount, using the given combination of product code and customer classification, the given charge date and the original bill date. Following the current favor policy, the function accumulates the VAT exclusive amount in the accumulated table at the appropriate rate.

VALIDATE

The VALIDATE object 48 controls operations requested concerning the validation of VAT categories, product codes, customer classifications and combinations of product codes and customer classifications. Nineteen functions are available within the object, eight of which are Boolean, in that they produce a true or false response to validation questions.

The first function returns true if a given VAT category exists in the VAT table and a valid VAT rate is assigned to this category on the given date.

The second function returns true if a given product code exists in the product table and a valid VAT category is assigned to this product code on the given date and a valid VAT rate is associated with this VAT category in the VAT table on the given date.

The third function returns true if a given customer classification exists in the customer table and a valid VAT category is assigned to this customer classification on the given date and a valid VAT rate is associated with this VAT category in the VAT table on the given date.

A fourth function returns true if the given combination of product code and customer classification exists in the pair table and a valid VAT category is assigned to this combination on the given date and a valid VAT rate is associated with this VAT category in the VAT table on the given date.

A fifth function returns true if the given VAT category is used in the VAT table, and a valid VAT rate applies to it for each date covered by the period from a given start date to a given end date.

A sixth function returns true if a given product code is used in the product table and a valid VAT category applies to this product code for each date covered by the period from a given period start date to a given period end date and if all VAT categories that apply to this product code over this period have valid VAT rates associated therewith in the VAT table for each date of the period to which they apply.

A seventh function returns true if a given customer classification is used in the customer table and a valid VAT category applies to this classification for each day covered by the period from a given period start date up to and including a given period end date and if all VAT categories that apply to this classification over this period have valid VAT rates associated therewith in the VAT table for each day of the period to which they apply.

An eighth function returns true if the given combination of product code and customer classification is used in the pair table and a valid VAT category applies to this combination for each date covered by the period from a given period start date to a given period end date and if all VAT categories that apply to this combination over this period have valid VAT rates associated therewith in the VAT table for each day of the period to which they apply.

A ninth function returns a VAT rate that applies to a given VAT category on the given date according to the VAT table. If the VAT category is not used in the VAT table, appropriate message is returned.

A tenth function returns the VAT category that applies to a given product code on a given date, according to the product table. If the product code is not used in the product table or if it is not valid on each day of the given period, an appropriate message is returned.

An eleventh function returns the VAT category applicable to a given customer classification on a given date, according to the customer table. If the classification is not used in the customer table or if it is not valid on each day of the period, an appropriate message is returned.

A twelfth function returns the VAT category applicable to a given combination of product code and customer classification on a given date, according to the pair table. If a combination is not used in the pair table or if it is not valid on each day of the period, an appropriate message is returned.

A thirteenth function returns the VAT rate applicable to a given product code on a given date according to the product table and the VAT table. If the product code is not used in the product table, an appropriate message is returned.

A fourteenth function returns the VAT rate applicable to a given customer classification on a given date according to the customer table and the VAT table. If a classification is not used in the customer table, an appropriate message is returned.

Fifteenth function returns the VAT rate applicable to a given combination of product code and customer classification on a given date, according to the pair table and VAT table. If the combination is not used in the pair table, an appropriate message is returned.

A sixteenth function returns a list of all VAT rates that are applicable to a given VAT category, according to the VAT table on one or more of the days of the period from a given start date to a given end date. If the given VAT category is not used in the VAT table, an appropriate message is returned.

A seventeenth function returns a list of all VAT categories applicable to a given product code, according to the product table, on one or more of the days of the period from the given period start date to a given period end date. If a given product code is not used in the product table, an appropriate message is returned.

An eighteenth function returns a list of all VAT categories applicable to a given customer classification, according to the customer table, on one or more of the days of a period from a period start date to a given period end date. If the given customer classification is not used in the customer table, an appropriate message is returned.

A nineteenth function returns a list of all VAT rates that are applicable to a given combination of product code and customer classification, according to the pair table, on one or more of the days of a period from a given period start date to a given period end date. If the given combination is not used in the pair table, an appropriate message is returned.

ACCUMULATE

The ACCUMULATE object 50 controls operations requested by billing operators concerned with resetting and retrieving information from maintained information items.

A first function resets the accumulator tables.

A second function returns a list of associations that are calculated from the accumulated VAT exclusive amounts and corresponding VAT rates stored in the accumulator table. The function also returns the VAT exclusive amount stored in this table to which VAT applies at zero rate and for which VAT is exempt.

CONFIGURATION MANAGER

The CONFIGURATION MANAGER object 53 controls operations requested by configuration operators, concerned with the changing of policies for calculating VAT charges.

The first function sets the favor policy attribute for accumulating single date charges to a given policy selected from the bill date or the charge date etc.

A second function returns the current value of the favor policy attribute used when calculating single date charges.

A third function sets a favor policy attribute for the accumulation of period charges to the new given policy, selected from bill date, end date, or apportion etc.

A fourth function returns the current value of the favor policy attribute for the accumulation of period charges.

A fifth function sets the rounding policy attribute of the ROUNDER object 52 to a new degree of accuracy. This defines a number of decimal places after which truncation takes place, which must be an integer value between one and six.

The sixth function returns the current value of the rounding policy attribute and the accuracy attribute of the ROUNDER object 52.

CONVERSION FROM THE OBJECT ORIENTED ENVIRONMENT

Figure 15A:
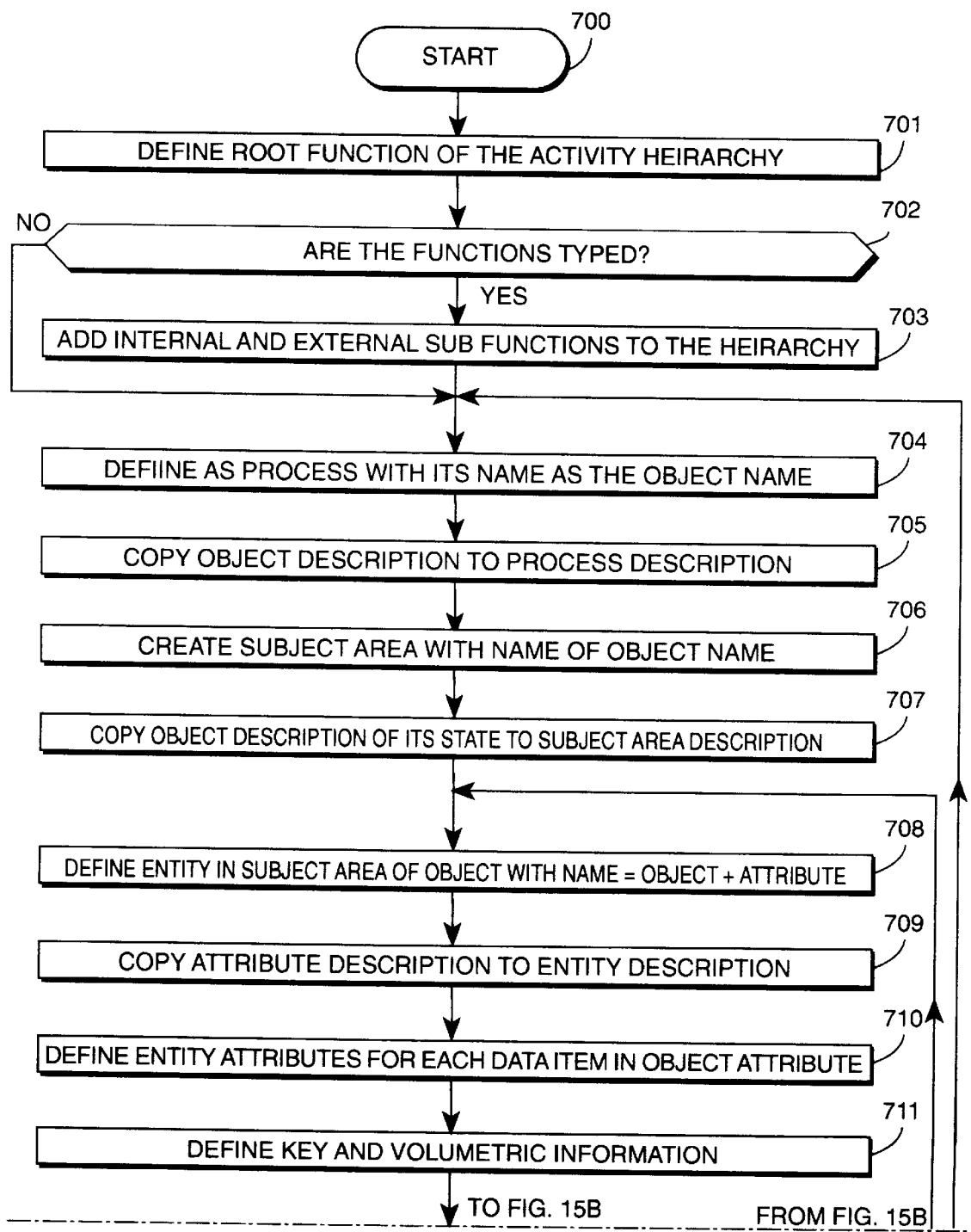
FIG. 15A and FIG. 15B detail the procedure identified at step 34 of FIG. 3, for converting the objects oriented code into the form of a procedural language.
Figure 15B:
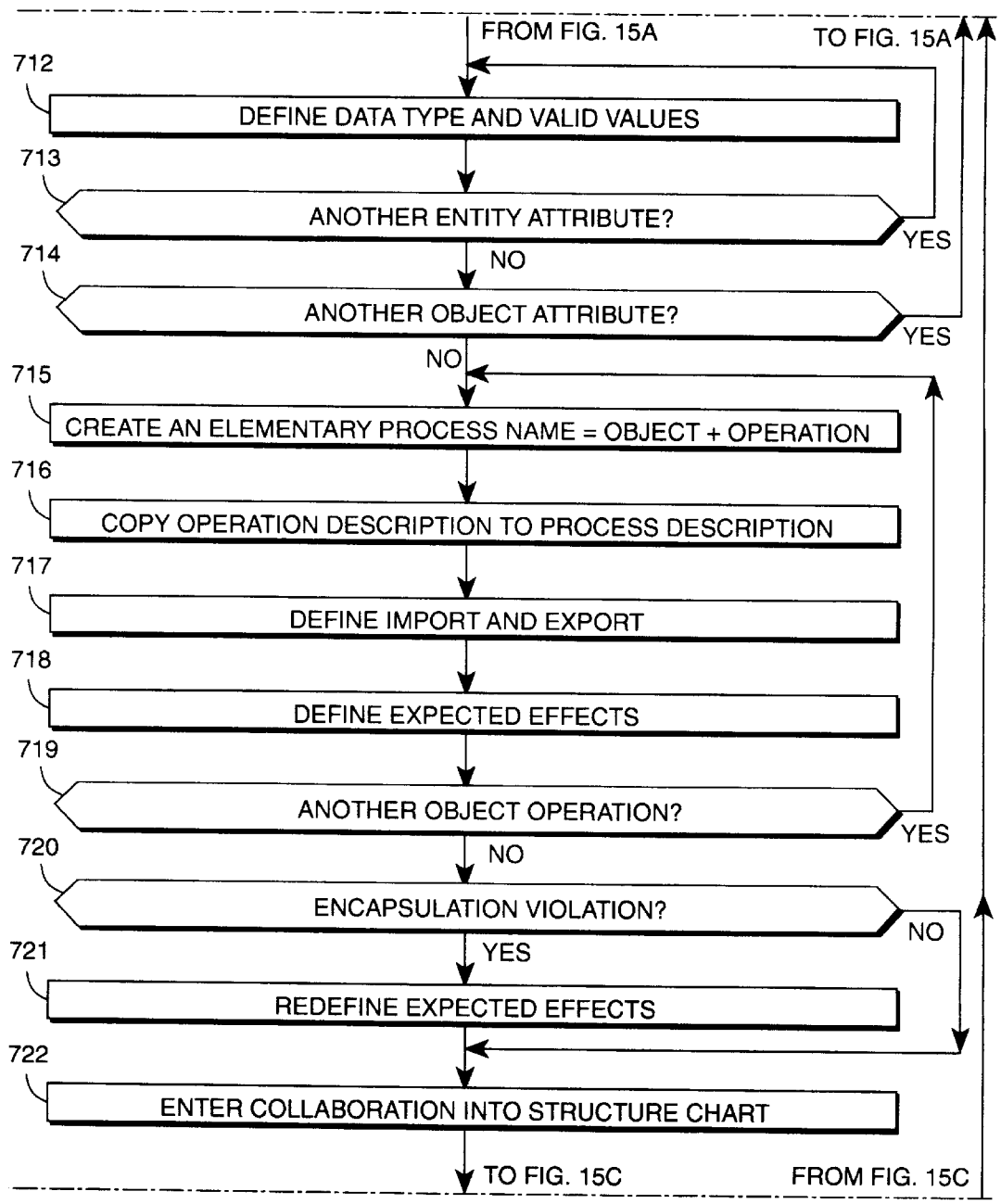
Figure 15C:
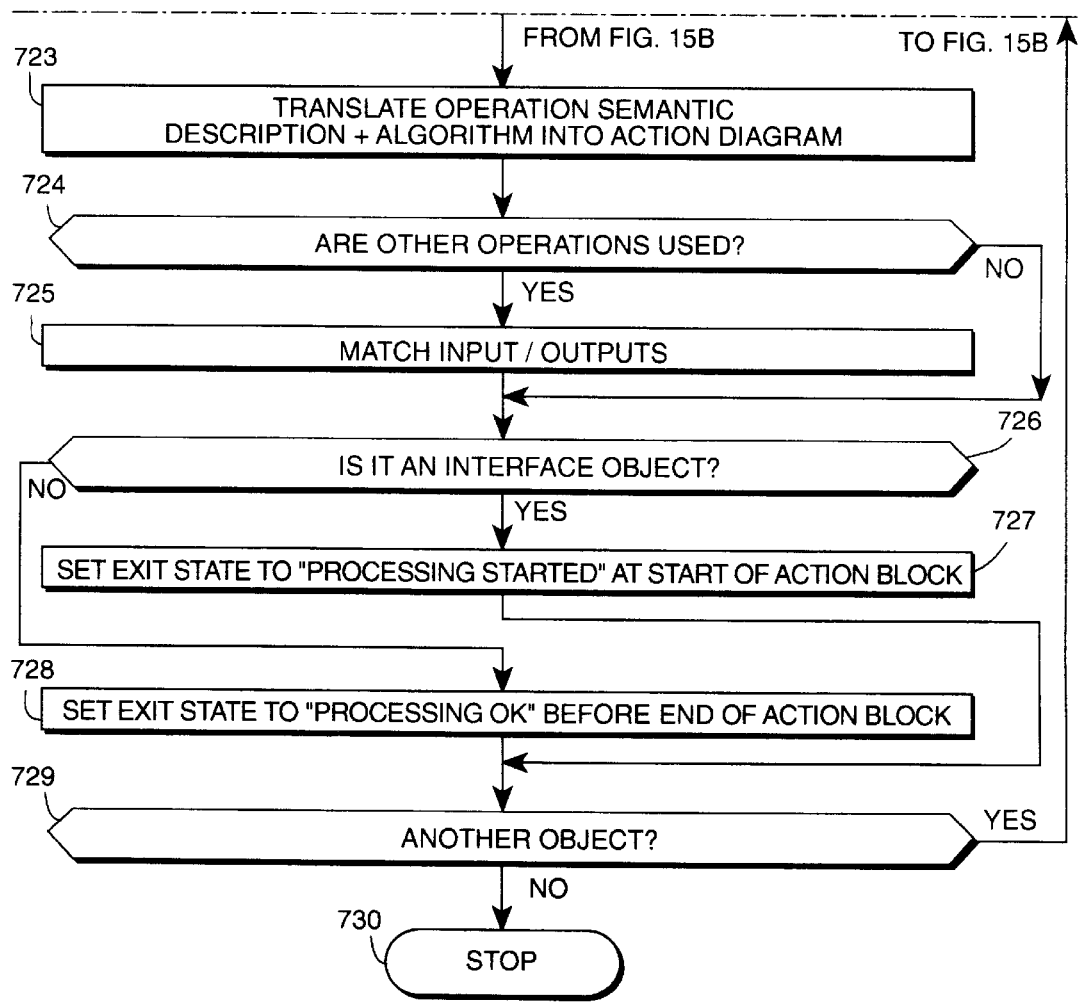

The procedure for converting the object oriented instructions into a procedural type language are detailed in FIGS. 15A and 15B.

In the present embodiment, the existing system was originally constructed from instructions defined by the COBOL language and instructions derived from the object oriented definition described above are converted into COBOL by initially being converted into instructions defined under the information engineering framework licensed by Texas Instruments Inc under the trade mark "IEF". Thus, the terminology used in the following description is derived from the terminology described under IEF, although, it should be appreciated that the underlying principles would be relevant to any suitable procedural type language.

A program constructed under IEF is defined in terms of an activity hierarchy. The procedure is initiated at step 700 and at step 701 the root function for the activity hierarchy is defined. The lowest levels of the hierarchy define actual executable programs. However, in the present embodiment, translation from the object oriented environment into the procedural environment is effected by defining objects in terms of the activity hierarchy. Thus, at step 701 the system name is defined as the root function within the hierarchy. In this embodiment, therefore, the root function would be described as "VAT processor".

A question is asked at step 702 as to whether the objects are typed, that is to say, whether the objects can be grouped together into clearly identifiable sets. If this question is answered in the affirmative, a sub-function is added to the activity hierarchy identifying the particular types of functions at 703. Alternatively, if the question asked at step 702 is answered in the negative, step 703 is bypassed and control is directed to step 704.

In the present example, the functions are typed in terms of internal objects and external objects wherein, as previously stated, the external objects provide interfaces to operators. Thus, in the present example, an internal function is added to the hierarchy at step 703 identifying the presence of internal functions and external functions.

Processing now continues by considering each object in turn. At step 704 a process is defined having a name equivalent to the object name. Each object in the object oriented environment is provided with an object description and this object description is copied to the process description at step 705.

In addition to processors being defined under the IEF, it is also necessary to define data areas. Thus, at this stage, the underlying distinction between procedural instructions and object oriented instructions becomes visible, in that, separate groupings are made, within the procedural environment, for procedures and data. The conversion from the object oriented environment into the procedural environment is effected by creating, for each object oriented object, a distinct process and a distinct data area which, when considered as a connected pair, reflect the definitions provided for that object within the object oriented environment.

At step 706 processing is initiated with respect to the data area for the object being considered. Thus, a subject area is created, for the storage of data, which is identified by a name derived from the original object name.

At step 707 a similar step is performed for the subject area which was performed for the process at step 705. Thus, the object description, defining its state, is copied to the subject area description.

Thus, on the termination of step 707, a process area and a data area has been defined for the instruction specified within the particular object.

Each object is itself defined, within the object oriented environment in terms of attributes 708 and it is now necessary to reflect these attributes within the object process of the procedural environment.

The attributes of the object oriented objects are defined within the IEF environment in terms of entities and, in accordance with IEF protocols, entities also have collections of attributes. In order to distinguish between an object oriented Attribute and a IEF attribute, objects oriented Attributes will be specified with an A.

At step 709 the Attributes description is copied to the entity description. At step 710 entity attributes are defined for each data item in the object Attribute.

An example may be considered as follows. In the object oriented environment an Attribute may specify the address of a customer. This address is translated into an entity within the procedural IEF environment and each attribute within this environment will specify an item of data, such as a single line of that address.

Within the IEF environment, entities and attributes are placed in data tables and in order to effect the transfer of information to and from the table, it is necessary to specify a key, that is to say, a relationship with a particular portion of the data entry and the particular location within the data table. Thus, at step 711 a key is defined for the data entity, along with volumetric information specifying the size of the entity within the database.

Thus, it will be appreciated that step 710 will create a number of attributes which are considered in turn at step 712. At step 712 data types are defined for each of these attributes and ranges of valid values are also specified. Thus, a question is asked at step 713 as to whether another entity attribute is present and if this question is answered in the affirmative, control is returned to step 712, whereupon the next attribute is considered.

If the question asked at step 713 is answered in the negative, a question is asked at step 714 as to whether another object Attribute is to be processed. If this question is answered in the affirmative, control is returned to step 708, whereupon a further entity is defined and attributes are specified within this entity.

Eventually, all of the object Attributes will have been considered and the question asked at step 714 will be answered in the negative, resulting in control being directed to step 715. After all of the object attributes have been considered for the particular object, resulting in provision being made for them within the procedural environment, the processing code is now transferred by creating an elementary process at step 715, given a name reflecting the name of its originating object and the particular operation under consideration.

At step 716 the operation description is copied to the process description and at step 717 imports and exports are defined, in terms of the nature of data transferred between particular objects.

At step 718 a definition is made of the expected effects, to the effect as to whether data is created deleted or transferred thereafter, a question is asked at step 719 as to whether another object operation is present and if this question is answered in the affirmative, control is returned to step 715. Eventually, the question asked at step 719 will be answered in the negative, resulting in control being directed to step 720.

The generation of code within the IEF environment will result in a create-read-update-delete (CRUD) matrix being created and this matrix provides the basis for ensuring that the encapsulation of the objects oriented environment has successfully been reflected in the procedural environment.

Within an object oriented environment, encapsulation refers to the structure by which objects are defined effectively in isolation, encapsulated, as separate recognisable entities. This encapsulation is reflected within the procedural environment, by ensuring that interactions between object-derived portions of the procedural code may only interact in the way specified by the encapsulation of the object oriented environment. Thus, at step 720 a question is asked as to whether there is any encapsulation violation and if this question is answered in the affirmative, the expected effects are re-defined at 721 so as to ensure correct encapsulation as defined within the object oriented environment. Alternatively, if the question asked at step 720 is answered in the negative, control is directed to step 722.

Thus, after the definitions for each of the objects, in terms of their respective process are and data area, has successfully been encapsulated within the procedural environment, operations within the object have been successfully translated. It is now necessary to specify the interactions between objects, therefore at step 722 object collaboration is specified in terms of entries made into the IEF structure chart.

At step 723 the operations performed by each object are translated into an algorithm compatible with the action diagram of the IEF environment.

A question is asked at step 724 as to whether other operations are used, that is to say, whether other objects are called by the particular object under consideration. If the question is answered in the affirmative, a match is made of inputs and outputs between the two objects at step 725. Alternatively, if the question asked at step 724 is answered in the negative, control is directed to step 726.

At step 726 the question is asked as to whether the object under consideration is an interface object. If this question is answered in the affirmative, the exit state within the IEF environment is set to "processing started" at the start of the action block. Alternatively, if the question asked at step 726 is answered in the negative, control is directed to step 728, whereupon the exit state is set to "processing OK" before the end of the action block.

After processing performed at step 727 or at step 728, the object from the object oriented environment has been fully translated within the procedural environment of the IEF and control is therefore directed to step 729.

At step 729 a question is asked as to whether another object from the object oriented environment is to be translated into the procedural environment and if answered in the affirmative, control is returned to step 704. Eventually, all of the objects will have been translated, resulting in the question being asked at step 729 being answered in the negative, whereupon the process terminates at step 730.

It should be noted that, by employing a conversion procedure such as that set out above, an object oriented environment can be used to configure and modify a data processing system which is otherwise built in a procedural environment. Hence an aspect of the present invention is the provision of a configuration system, for use in a billing and charging environment incorporating procedural based data processing, comprising parts i) to iv) set out above in the summary of the invention.

What is claimed is:

1. A process for generating billable amounts in respect of data records for the supply of goods or services over a period of time, said process comprising:

a period charge interface object, which provides control functionality for use by the process in relation to charges incurred over a period of time;

a tax table object, defining tax rates and callable by said period charge interface object;

a tax calculation object for calculating tax values in respect of said supply of goods or services, callable by the period charge interface object;

an accumulation object, for accumulating values returned to the period charge object from the tax calculation object, wherein, in use, input data including a period start date and a period end date are supplied to the period charge interface object, tax rates are supplied to the period charge interface object from the tax table object, a tax calculation is made by the tax calculation object, and the resulting calculated tax values are supplied to the accumulation object; and wherein a "table manager" object is arranged to supply values to the tax table object and to select operational policy options.

2. A process according to claim 1, wherein the calculation of tax at the bill date is a selectable option.

3. A process according to claim 1, wherein the calculation of tax at the end of the usage date is a selectable option.

4. A process according to claim 1, wherein the apportionment of tax over the usage period is a selectable option.

5. A process according to claim 1, including a "single date charge" object for calculating tax for a transaction occurring at a specific date, wherein said single date charge object is arranged to call the tax table object and the accumulation object.

6. A process according to claim 1, including a "tax refund" object arranged to call said tax calculation object, the period charge object and a re-tax object.

7. A process according to claim 1, wherein a "rounder" object callable by said tax calculation object is arranged to round values calculated by said tax calculation object.

8. A process according to claim 7, wherein a "configuration" object is arranged to facilitate programming of said rounder object.

9. Apparatus for processing data representing a supply of goods or services over a period of time to calculate tax associated with said supply, comprising processing means facilitating execution within an object orientated environment, characterised by the provision of:

a "period charge" interface object;

a "tax table" object defining tax rates and callable by the period charge interface object;

a tax calculation object for calculating tax for individual items, callable by the period charge interface object; and an "accumulation" object for accumulating values returned to the period charge object from said tax calculation object, wherein input data including a period start date and a period end date are supplied to the period charge interface object, tax rates are supplied to the period charge object from the tax table object, the tax calculation is made by the tax calculation object, and calculated tax value is supplied to the accumulation object.

10. A method of converting programs developed under an object oriented environment into instructions implementable by a procedurally based processing device, said method comprising:

(a) creating an activity hierarchy of functions for each of said objects;

(b) creating a data subject area for each of said objects; and (c) defining a matrix of processes against data entities resulting from steps (a) and (b) arranged to specify the relationship between object derived programs and object derived data subject areas to thereby retain encapsulation as defined by an object oriented program.

11. A method according to claim 10, wherein said step of creating a data area includes defining a process for each object.

12. A method according to claim 10, wherein said data area creation step includes copying object descriptions to respective process descriptions.

13. A method according to claim 10, wherein said step of creating a procedural program includes creating an elementary process derived from an object and from an operation.

14. A method according to claim 10, wherein said activity hierarchy creation step includes defining import and export values.

15. A method according to claim 10, including checks for encapsulation violation.

16. A method of calculating taxes defined in an object oriented environment and converted into a procedural program by a method according to claim 10.

17. A method according to claim 16, wherein said object oriented definition includes:

a "period charge" interface object;

a "tax table" object defining tax rates and callable by said period charge interface object;

a tax calculation object for calculating tax for individual items, callable by the period charge interface object; and an "accumulation" object for accumulating values returned to the period charge object from said tax calculation object, wherein input data including a period start date and a period end date are supplied to the period charge interface object, tax rates are supplied to the period charge object from the tax table object, a tax calculation is made by the tax calculation object, and the calculated tax value is supplied to the accumulation object.

18. A process according to claim 17, wherein a "rounder" object callable by said tax calculation object, is arranged to round values calculated by said tax calculation object.

19. A process according to claim 17, wherein a "configuration" object is arranged to facilitate programming of said rounder object.

20. A data processing system, for use in pricing and charging equipment, to process data relevant to a period of time by selecting and applying appropriately one or more date-related modifying factors, the system comprising:

i) a data input for the data, said data
  a) relating to one or more chargeable event(s),
  b) containing for each chargeable event at least one charge-related value, as duration, and at least one event date, and
  c) wherein, for at least one chargeable event, an event date comprises a start date and an end date relating to a period of time;

ii) a process control module for controlling processing of said data;

iii) a first data store for holding at least one set of definitions, each definition comprising, directly or indirectly, at least one of said modifying factors and at least one definition including one or more dates of validity relating to a modifying factor;

iv) a second data store arranged in sections for allocation to respective modifying factors;

v) means for determining a relevant identifier for each charge-related value; and vi) calculating means for calculating a set of charge values from said charge-related values together with price data wherein the process control module is arranged, on receipt of the data at the input, to control the system such that it:

vii) determines a relevant identifier for each charge-related value from the data;

viii) accesses the first data store and locates the relevant definition or definitions for that identifier;

ix) calculates a set of charge values from said charge-related values together with price data;

x) sorts the charge values according to modifying factor, using the relevant definition; and xi) outputs the charge values to the relevant sections of the second data store, the charge value for any chargeable event for which the event date comprises a start date and an end date being apportioned between sections in accordance with any date of validity included in a relevant definition.

21. A system as in claim 20 wherein the modifying factor for a section of the second data store is zero.

22. A system as in claim 20 wherein the first data store holds a plurality of sets of definitions, the identifiers for each of the definitions being unique.

23. A system as in claim 20 wherein the data contains, for each chargeable event, an identifier for a definition.

24. A system as in claim 20 wherein the means for determining a relevant identifier comprises means for identifying category codes contained by the data in relation to the chargeable events, and for identifying predetermined combinations of category codes in relation to a chargeable event, each such combination of category codes determining a different identifier in place of the identifiers otherwise determined by each of the category codes on its own.

25. A system as in claim 20 which further comprises means to input one or more new definitions to said first data store.

26. A system as in claim 20 which further comprises means for substituting, at step x), a different date for a date of validity from a definition, and for repeating steps vii) to xi) in respect of data previously processed by the system.

27. A system as in claim 20 which further comprises means for updating one or more definitions in the first data store and for reprocessing data, by use of the system, using the updated definitions.

28. Apparatus for use in a system as in claim 20 for processing data representing a supply of goods or services over a period of time to calculate tax associated with said supply, the apparatus comprising processing means facilitating execution within an object orientated environment, characterized by the provision of:

a "period charge" interface object;

a "tax table" object defining tax rates and callable by the period charge interface object;

a tax calculation object for calculating tax for individual items, callable by the period charge interface object; and an "accumulation" object for accumulating values returned to the period charge object from said tax calculation object, wherein input data including a period start date and a period end date are supplied to the period charge interface object, tax rates are supplied to the period charge object form the tax table object, the tax calculation is made by the tax calculation object, and calculated tax value is supplied to the accumulation object.

29. A process for generating billable amounts in respect of data records for the supply of goods or services over a period of time, by use of a system according to claim 20, the process being characterized by:

a period charge interface object, which provides control functionality for use by the process in relation to charges incurred over a period of time;

a tax table object, defining tax rates and callable by said period charge interface object;

a tax calculation object for calculating tax values in respect of said supply of goods or services, callable by the period charge interface object; and an accumulation object, for accumulating values returned to the period charge object from the tax calculation object, wherein, in use, input data including a period start date and a period end date are supplied to the period charge interface object, tax rates are supplied to the period charge interface object from the tax table object, a tax calculation is made by the tax calculation object, and the resulting calculated tax values are supplied to the accumulation object.

30. A process as in claim 29 including a "tax refund" object arranged to call said tax calculation object, the period charge object and a re-tax object.

31. A process as in claim 29 wherein a "rounder" object callable by said tax calculation object is arranged to round values calculated by said tax calculation object.

32. A process as in claim 31 wherein a "configuration" object is arranged to facilitate programming of said rounder object.

33. A process as in claim 29 wherein a "table manager" object is arranged to supply values to the tax table object and to select operational policy options.

34. A process as in claim 33 wherein the calculation of tax at the bill date is a selectable option.

35. A process as in claim 33 wherein the calculation of tax at the end of the usage date is a selectable option.

36. A process as in claim 33 wherein the apportionment of tax over the usage period is a selectable option.

37. A process as in claim 29 including a "single date charge" object for calculating tax for a transaction occurring at a specific date, wherein said single date charge object is arranged to call the tax table object and the accumulation object.

38. A configuration management system, for use in configuring pricing and charging equipment for processing data which has an associated set of modifying factors, by selecting and applying appropriately one or more of said modifying factors, the configuration management system including a data processing system for use in pricing and charging equipment, to process data relevant to a period of time by selecting and applying appropriately one or more date-related modifying factors, the data processing system comprising:

i) a data input for the data, said data
   a) relating to one or more chargeable event(s),
   b) containing for each chargeable event at least one charge-related value, as duration, and at least one event date, and
   c) wherein, for at least one chargeable event, an event date comprises a start date and an end date relating to a period of time;

ii) a process control module for controlling processing of said data;

iii) a first data store for holding at least one set of definitions, each definition comprising, directly or indirectly, at least one of said modifying factors and at least one definition including one or more dates of validity relating to a modifying factor;

iv) a second data store arranged in sections for allocation to respective modifying factors;

v) means for determining a relevant identifier for each charge-related value; and vi) calculating means for calculating a set of charge values from said charge-related values together with price data wherein the process control module is arranged, on receipt of the data at the input, to control the system such that it:

vii) determines a relevant identifier for each charge-related value from the data;

viii) accesses the first data store and locates the relevant definition or definitions for identifier;

ix) calculates a set of charge values from said charge-related values together with price data;

x) sorts the charge values according to modifying factor, using the relevant definition; and xi) outputs the charge values to the relevant sections of the second data store, the charge value for any chargeable event for which the event date comprises a start date and an end date being apportioned between sections in accordance with any date of validity included in a relevant definition.

39. A process for use in pricing and charging event-related data relevant to a period of time, the data having been output by a communications system, said process comprising:

i) determining a relevant identifier for each charge-related value from the data;

ii) accessing a first data store and locating a relevant definition or definitions for that identifier;

iii) calculating a set of charge values from said charge-related values together with price data;

iv) sorting the charge values according to modifying factor, using the relevant definition; and outputting the charge values to relevant sections of a second date store;

wherein the charge value for any chargeable event for which the event date comprises a start date and an end date being apportioned between sections of the second data store in accordance with any date of validity included in a relevant definition.

* * * * *